United States Patent
Miyoshi et al.

(10) Patent No.: US 10,434,867 B1
(45) Date of Patent: Oct. 8, 2019

(54) COOLING APPARATUS OF VEHICLE DRIVING APPARATUSES

(71) Applicant: TOYOTA JIDOSHA KABUSHIKI KAISHA, Aichi (JP)

(72) Inventors: Yuji Miyoshi, Susono (JP); Takuya Hirai, Susono (JP); Tomohiro Shinagawa, Shizuoka-ken (JP); Hiroyuki Sugihara, Shizuoka-ken (JP)

(73) Assignee: TOYOTA JIDOSHA KABUSHIKI KAISHA, Aichi-Ken (JP)

(*) Notice: Subject to any disclaimer, the term of this patent is extended or adjusted under 35 U.S.C. 154(b) by 0 days.

(21) Appl. No.: 16/270,525

(22) Filed: Feb. 7, 2019

(30) Foreign Application Priority Data

Mar. 29, 2018 (JP) ................. 2018-064729

(51) Int. Cl.
  *B60K 11/04* (2006.01)
  *B60K 6/22* (2007.10)
  *F01P 3/18* (2006.01)
  *F01P 7/14* (2006.01)

(52) U.S. Cl.
  CPC ........... *B60K 11/04* (2013.01); *B60K 6/22* (2013.01); *F01P 3/18* (2013.01); *F01P 7/14* (2013.01); *B60Y 2200/92* (2013.01); *B60Y 2306/05* (2013.01); *F01P 2003/185* (2013.01); *F01P 2007/146* (2013.01); *F01P 2025/08* (2013.01); *F01P 2050/24* (2013.01)

(58) Field of Classification Search
  CPC ...... F01P 2007/16; F01P 2050/24; F01P 3/18; F01P 7/14; B60Y 2306/05; B60Y 2200/92; B60K 6/22; B60K 11/04
  See application file for complete search history.

(56) References Cited

U.S. PATENT DOCUMENTS

| 4,108,720 A * | 8/1978 | Sato ............... G21C 7/36 376/210 |
| 4,580,531 A * | 4/1986 | N'Guyen ........... F01P 7/048 123/41.1 |
| 9,581,072 B2 * | 2/2017 | Hutchins |
| 10,221,753 B2 * | 3/2019 | Sakamoto ............ F01P 3/02 |
| 2008/0251303 A1 | 10/2008 | Rouaud et al. |

(Continued)

FOREIGN PATENT DOCUMENTS

| JP | 4753996 B2 | 8/2011 |
| JP | 2013-177026 A | 9/2013 |
| WO | 2007/031670 A1 | 3/2007 |

*Primary Examiner* — James A Shriver, II
*Assistant Examiner* — James J Triggs
(74) *Attorney, Agent, or Firm* — Hauptman Ham, LLP

(57) ABSTRACT

A cooling apparatus of vehicle driving apparatuses of the invention controls flow of cooling water so as to cool engine cooling water by at least two radiators when a requested ability of cooling an internal combustion engine, is equal to or larger than a requested ability of cooling a hybrid device. The number of the radiators used for cooling the engine cooling water is larger than the number of the remaining radiator(s). The cooling apparatus controls the flow of the cooling water so as to cool device cooling water at least two radiators when the requested ability of cooling the hybrid device, is larger than the requested ability of cooling the internal combustion engine. The number of the radiators used for cooling the device cooling water is larger than the number of the remaining radiator(s).

7 Claims, 12 Drawing Sheets

(56) References Cited

U.S. PATENT DOCUMENTS

| | | |
|---|---|---|
| 2013/0226380 A1 | 8/2013 | Ando et al. |
| 2015/0144078 A1* | 5/2015 | Hutchins ................. F01P 7/165 |
| | | 123/41.1 |
| 2015/0176472 A1* | 6/2015 | Hutchins ................... F01P 7/16 |
| | | 701/102 |
| 2016/0290216 A1* | 10/2016 | Katragadda .............. F01P 11/16 |
| 2016/0347150 A1* | 12/2016 | Kakade .............. B60H 1/00885 |

* cited by examiner

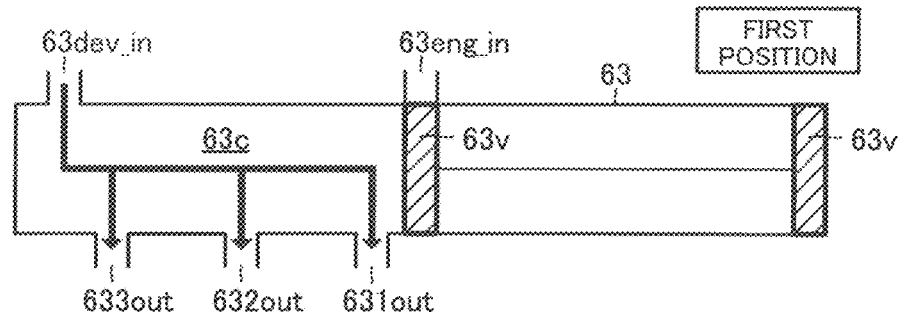
FIG.3A
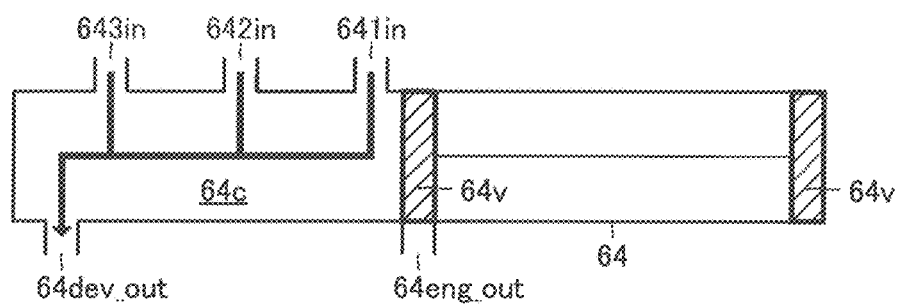
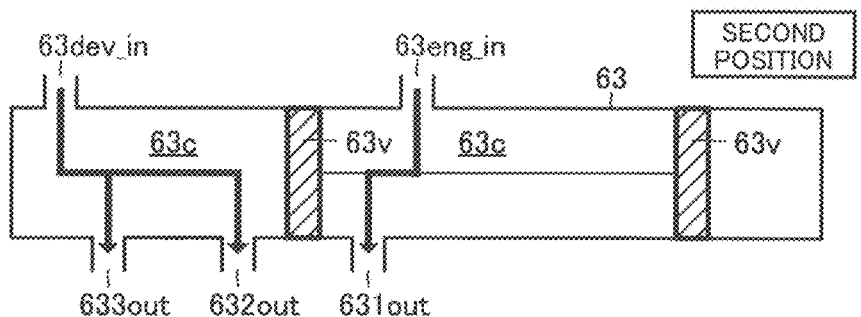
FIG.3B
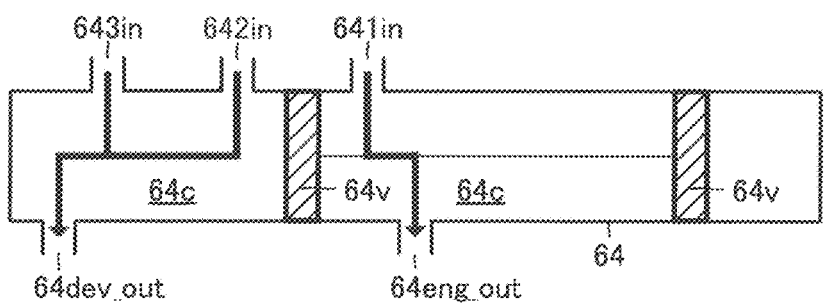

COOLING APPARATUS OF VEHICLE DRIVING APPARATUSES

RELATED APPLICATIONS

The present application claims priority to Japanese Patent Application No. 2018-064729 filed Mar. 29, 2018, the disclosure of which is hereby incorporated by reference herein in its entirety.

BACKGROUND

Field

The invention relates to a cooling apparatus for cooling vehicle driving apparatuses which generate power for driving a vehicle.

Description of the Related Art

There is known a hybrid vehicle which comprises an internal combustion engine and an electric motor as vehicle driving apparatuses. The hybrid vehicle comprises a cooling apparatus including a cooling water circulation circuit, in which cooling water flows for cooling the internal combustion engine, thereby preventing a temperature of the internal combustion engine from increasing excessively. A radiator is provided in the cooling water circulation circuit for cooling the cooling water which flows in the cooling water circulation. Hereinafter, the cooling water circuit will be referred to as "the engine water circulation circuit", and the radiator provided in the engine water circulation circuit will be referred to as "the engine radiator".

In addition, the hybrid vehicle comprises a hybrid device which includes an electric motor, a battery for supplying electric power to the electric motor, a power control unit for controlling supply of the electric power from the battery to the electric motor, etc. The cooling apparatus of the vehicle driving apparatuses of the hybrid vehicle comprises a cooling water circulation circuit, in which the cooling water flows for cooling the hybrid device, thereby preventing a temperature of the hybrid device from increasing excessively. A radiator is provided in the cooling water circulation circuit, in which the cooling water flows for cooling the hybrid device. This radiator cools the cooling water flowing in the cooling water circulation circuit, in which the cooling water flows for cooling the hybrid device. Hereinafter, the cooling water circulation circuit, in which the cooling water flows for cooling the hybrid device, will be referred to as "the device water circulation circuit, and the radiator for cooling the cooling water flowing in the device water circulation circuit will be referred to as "the device radiator".

Further, there is known a cooling apparatus of the vehicle driving apparatuses of the hybrid vehicle which uses the cooling water cooled by the engine and device radiators for cooling the internal combustion engine by connecting the engine water circulation circuit to the device water circulation circuit when the internal combustion engine cannot be cooled to a desired temperature by the cooling water cooled only by the engine radiator (see JP 4753996 B).

In general, the radiators are provided in a compartment provided at a front portion of the hybrid vehicle. A space of the compartment is limited. Therefore, the engine radiator should be small when the engine and device radiators are provided in the compartment. Thereby, an ability of the engine radiator to cool the cooling water is low.

Thus, the internal combustion engine may not be cooled sufficiently, for example, when an output power of the internal combustion engine is large and thus, an amount of heat generated by the internal combustion engine is large.

SUMMARY

The invention has been made for solving problems described above. An object of the invention is to provide a cooling apparatus of vehicle driving apparatuses which can cool the internal combustion engine sufficiently in a vehicle which comprises a radiator for cooling the cooling water used for cooling the internal combustion engine and a radiator for cooling the cooling water used for cooling the hybrid device.

A cooling apparatus of vehicle driving apparatuses including an internal combustion engine (110) and at least one electric motor (111, 112) for driving a vehicle (100) according to the invention comprises an engine water circulation circuit (11), a device water circulation circuit (31), at least three radiators (12, 32, 51, 52, 53), and an electronic control unit (90).

The engine water circulation circuit (11) includes an engine internal water passage (14). The engine internal water passage (14) is formed in the internal combustion engine (110). Cooling water is supplied to the engine internal water passage (14) for cooling the internal combustion engine (110). The device water circulation circuit (31) includes a device internal water passage (34). The device internal water passage (34) is formed in a hybrid device (180). The hybrid device (180) includes the at least one electric motor (111, 112). The cooling water is supplied to the device internal water passage (34) for cooling the hybrid device (180). The at least three radiators (12, 32, 51, 52, 53) cool the cooling water. The electronic control unit (90) controls flow of the cooling water.

The electronic control unit (90) is configured to control the flow of the cooling water so as to cool engine cooling water which is the cooling water supplied to the engine internal water passage (14) by at least two (12, 51, 52) of the radiators (12, 32, 51, 52, 53) (see FIG. 7 and a process of a step 1140 in FIG. 11) when a requested ability of the engine cooling water to cool the internal combustion engine (110), is equal to or larger than a requested ability of the cooling water supplied to the device internal water passage (34) to cool the hybrid device (180) (see a determination "No" at a step 1120 in FIG. 11). The number of the radiators (12, 51, 52) used for cooling the engine cooling water is larger than the number of the remaining radiator or radiators (32, 53).

The electronic control unit (90) is further configured to control the flow of the cooling water so as to cool device cooling water which is the cooling water supplied to the device internal water passage (34) by at least two (32, 52, 53) of the radiators (12, 32, 51, 52, 53) (see FIG. 6 and a process of a step 1130 in FIG. 11) when the requested ability of the device cooling water to cool the hybrid device (180), is larger than the requested ability of the engine cooling water to cool the internal combustion engine (110) (see a determination "Yes" at the step 1120 in FIG. 11). The number of the radiators (32, 52, 53) used for cooling the device cooling water is larger than the number of the remaining radiator or radiators (12, 51).

The internal combustion engine operates optimally when a temperature of the internal combustion engine is maintained within a predetermined engine temperature range. Also, the hybrid device operates optimally when a temperature of the hybrid device is maintained within a predetermined device temperature range. Therefore, the number of the radiators used for cooling the engine cooling water and the number of the radiators used for cooling the device cooling water should be determined properly, depending on the requested ability of the engine cooling water to cool the internal combustion engine and the requested ability of the device cooling water to cool the hybrid device in order to maintain the temperature of the internal combustion engine within the predetermined engine temperature range and the temperature of the hybrid device within the predetermined device temperature range, respectively.

According to the invention, the number of the radiators used for cooling the engine cooling water is equal to or larger than the number of the radiators used for cooling the device cooling water when the requested ability of the engine cooling water to cool the internal combustion engine is larger than the requested ability of the device cooling water to cool the hybrid device. On the other hand, when the requested ability of the device cooling water to cool the hybrid device is larger than the requested ability of the engine cooling wager to cool the internal combustion engine, the number of the radiators used for cooling the device cooling water is larger than the number of the radiators used for cooling the engine cooling water.

As described above, the cooling water having the cooling ability depending on the requested ability of the engine cooling water to cool the internal combustion engine, is supplied to the engine internal water passage, and the cooling water having the cooling ability depending on the requested ability of the device cooling water to cool the hybrid device, is supplied to the device internal water passage. Therefore, the internal combustion engine and the hybrid device can be cooled sufficiently, independently of a relationship between the requested ability of the engine cooling water to cool the internal combustion engine and the requested ability of the device cooling water to cool the hybrid device. Thus, the temperature of the internal combustion engine can be surely maintained within the predetermined engine temperature range, and the temperature of the hybrid device can be surely maintained within the predetermined device temperature range.

According to an aspect of the invention, the electronic control unit (90) may be configured to control the flow of the cooling water so as to cool the device cooling water by at least one (32, 53) of the radiators (12, 32, 51, 52, 53) (see FIG. 7 and the process of the step 1140 in FIG. 11) when the requested ability of the engine cooling water to cool the internal combustion engine (110), is equal to or larger than the requested ability of the device cooling water to cool the hybrid device (180) while the internal combustion engine (110) operates, and the hybrid device (180) operates (see the determination "No" at the step 1120 in FIG. 11).

In this aspect, the electronic control unit (90) may be further configured to control the flow of the cooling water so as to cool the engine cooling water by at least one (12, 51) of the radiators (12, 32, 51, 52, 53) (see FIG. 6 and the process of the step 1130 in FIG. 11) when the requested ability of the engine cooling water to cool the hybrid device (180), is larger than the requested ability of the device cooling water to cool the internal combustion engine (110) while the internal combustion engine (110) operates, and the hybrid device (180) operates (see the determination "Yes" at the step 1120 in FIG. 11).

The hybrid device generates heat while the hybrid device operates. Therefore, it is preferred that at least one radiator is used for cooling the device cooling water without using all the radiators for cooling the engine cooling water in order to maintain the temperature of the hybrid device within the predetermined device temperature range even when the requested ability of the engine cooling water to cool the internal combustion engine is equal to or larger than the requested ability of the device cooling water to cool the hybrid device.

According to this aspect of the invention, the device cooling water is cooled by at least one radiator while the hybrid device operates even when the internal combustion engine operates, and the requested ability of the engine cooling water to cool the internal combustion engine is equal to or larger than the requested ability of the device cooling water to cool the hybrid device. Therefore, the temperature of the hybrid device can be surely maintained within the predetermined device temperature range.

Similarly, the internal combustion engine generates heat while the internal combustion engine operates. Therefore, it is preferred that at least one radiator is used for cooling the engine cooling water without using all the radiators for cooling the device cooling water in order to maintain the temperature of the internal combustion engine within the predetermined engine temperature range even when the requested ability of the device cooling water to cool the hybrid device is larger than the requested ability of the engine cooling water to cool the internal combustion engine.

According to this aspect of the invention, the engine cooling water is cooled by at least one radiator while the internal combustion engine operates even when the hybrid device operates, and the requested ability of the device cooling water to cool the hybrid device is larger than the requested ability of the engine cooling water to cool the internal combustion engine. Therefore, the temperature of the internal combustion engine can be surely maintained within the predetermined engine temperature range.

According to another aspect of the invention, the electronic control unit (90) may be configured to control the flow of the cooling water so as to cool the device cooling water by the radiator or radiators (32, 51, 52, 53) other than at least one radiator (12) (see FIG. 5, a process of a step 1020 in FIG. 10, a process of a step 1025 in FIG. 10, and a process of a step 1170 in FIG. 11) when the requested ability of the device cooling water is larger than the requested ability of the engine cooling water, and the requested ability of the engine cooling water is zero (see a determination "No" at a step 1005 in FIG. 10, a determination "No" at a step 1010 in FIG. 10, and a determination "No" at a step 1150 in FIG. 11).

In this aspect of the invention, the electronic control unit (90) may be further configured to control the flow of the cooling water so as to cool the engine cooling water by the radiator or radiators (12, 51, 52, 53) other than at least one radiator (32) (see FIG. 8, a process of a step 1045 in FIG. 10, a process of a step 1050 in FIG. 10, and a process of a step 1160 in FIG. 11) when the requested ability of the engine cooling water is larger than the requested ability of the device cooling water, and the requested ability of the device cooling water is zero (see a determination "No" at a step 1030 in FIG. 10, a determination "No" at a step 1035 in FIG. 10, and a determination "Yes" at the step 1150 in FIG. 11).

When the requested ability of the engine cooling water is zero, the engine cooling water is not needed to be cooled by the radiator(s). In this case, all the radiators may be used for cooling the device cooling water in order to supply the cooling water having a larger cooling ability to the device internal water passage.

In this regard, if all the radiators are used for cooling the device cooling water, the temperatures of all the radiators have increased to relatively high temperatures, respectively when the requested ability of the engine cooling water becomes larger than zero. Thus, when one or more of the radiators is/are used for cooling the engine cooling water, the cooling water which has a relatively high temperature, is supplied to the engine internal water passage, and the cooling water which remains in the radiator(s) and has the relatively high temperature, is supplied to the engine internal water passage. In this case, the internal combustion engine may not be cooled sufficiently.

According to this aspect of the invention, the device cooling water is cooled by the radiator(s) other than at least one radiator when the requested ability of the engine cooling water is zero. Therefore, the at least one radiator is not used for cooling the device cooling water. Thus, the internal combustion engine can be cooled sufficiently by using the radiator which has not been used for cooling the device cooling water, for cooling the engine cooling water when the requested ability of the engine cooling water becomes larger than zero.

Similarly, when the requested ability of the device cooling water is zero, the device cooling water is not needed to be cooled by the radiator(s). In this case, all the radiators may be used for cooling the engine cooling water in order to supply the cooling water having the larger cooling ability to the engine internal water passage.

In this regard, if all the radiators are used for cooling the engine cooling water, the temperatures of all the radiators have increased to the relatively high temperatures, respectively when the requested ability of the device cooling water becomes larger than zero. Thus, when one or more of the radiators is/are used for cooling the device cooling water, the cooling water which has the relatively high temperature, is supplied to the device internal water passage, and the cooling water which remains in the radiator(s) and has the relatively high temperature, is supplied to the device internal water passage. In this case, the hybrid device may not be cooled sufficiently.

According to this aspect of the invention, the engine cooling water is cooled by the radiator(s) other than at least one radiator when the requested ability of the device cooling water is zero. Therefore, the at least one radiator is not used for cooling the engine cooling water. Thus, the hybrid device can be cooled sufficiently by using the radiator which has not been used for cooling the engine cooling water, for cooling the device cooling water when the requested ability of the device cooling water becomes larger than zero.

According to further another aspect of the invention, the electronic control unit (90) may be configured not to use the radiator or radiators (51, 52, 53) which had been used for cooling the engine cooling water, for cooling the device cooling water until a predetermined time elapses since the radiator or radiators (51, 52, 53) was or were not used for cooling the engine cooling water (see determinations "No" at a step 1225 in FIG. 12) when the requested ability of the device cooling water becomes larger than the requested ability of the engine cooling water (see a determination "Yes" at a step 1220 in FIG. 12).

The radiator(s) which had been used for cooling the engine cooling water, may be used for cooling the device cooling water when the number of the radiators used for cooling the device cooling water, is increased in response to the requested ability of the device cooling water becoming larger than the requested ability of the engine cooling water.

In this regard, the temperature(s) of the radiator(s) which had been used for cooling the engine cooling water, is/are relatively high. Thus, when the radiator(s) which had been used for cooling the engine cooling water, is/are used for cooling the device cooling water, the cooling water which has a relatively high temperature, is supplied to the device internal water passage. In addition, the cooling water which remains in the radiator(s) and has the relatively high temperature, is supplied to the device internal water passage. In this case, the hybrid device may not be cooled sufficiently.

According to this aspect of the invention, when the requested ability of the device cooling water becomes larger than the requested ability of the engine cooling water, the radiator(s) which had been used for cooling the engine cooling water, is/are not used for cooling the device cooling water until the predetermined time elapses since the radiator(s) was/were not used for cooling the engine cooling water. Therefore, the cooling water having the relatively high temperature is prevented from being supplied to the device internal water passage. Thus, the hybrid device can be cooled sufficiently.

According to further another aspect of the invention, the electronic control unit (90) may be configured not to use the radiator or radiators (51, 52, 53) which had been used for cooling the engine cooling water, for cooling the device cooling water until a predetermined time elapses since the radiator or radiators (51, 52, 53) was or were not used for cooling the engine cooling water (see the determinations "No" at the step 1225 and determinations "No" at steps 1235 and 1265 in FIG. 12) even when the number of the radiators used for cooling the device cooling water should be increased by using the radiator or radiators (51, 52, 53) which had been used for cooling the engine cooling water (see determinations "Yes" at steps 1222, 1232, and 1262 in FIG. 12).

As described above, the temperature(s) of the radiator(s) which had been used for cooling the engine cooling water, is/are relatively high. Thus, when the radiator(s) which had been used for cooling the engine cooling water, is/are used for cooling the device cooling water, the cooling water which has the relatively high temperature, is supplied to the device internal water passage. In addition, the cooling water which remains in the radiator(s) and has the relatively high temperature, is supplied to the device internal water passage. In this case, the hybrid device may not be cooled sufficiently.

According to this aspect of the invention, when the number of the radiators used for cooling the device cooling water should be increased by using the radiator(s) which had been used for cooling the engine cooling water, for cooling the device cooling water, the radiator(s) which had been used for cooling the engine cooling water, is/are not used for cooling the device cooling water until the predetermined time elapses since the radiator(s) was/were not used for cooling the engine cooling water. Therefore, the cooling water having the relatively high temperature is prevented from being supplied to the device internal water passage. Thus, the hybrid device can be cooled sufficiently.

In addition, according to this aspect of the invention, the number of the radiators used for cooling the device cooling water can be increased promptly by using the radiator(s) which had not been used for cooling the engine cooling water, for cooling the device cooling water if there is/are the radiator(s) which had not been used for cooling the engine cooling water when the number of the radiators used for cooling the device cooling water should be increased. Thus, the hybrid device can be surely cooled sufficiently.

According to further another aspect of the invention, the cooling apparatus may comprise a variable cooling apparatus (50) including a first radiator (51), a second radiator (52), and a third radiator (53). The variable cooling apparatus (50)

may return the cooling water flowing out of the engine water circulation circuit (11) to the engine water circulation circuit (11) through the first and second radiators (51, 52) and return the cooling water out of the device water circulation circuit (31) to the device water circulation circuit (31) through the third radiator (53) when the variable cooling apparatus (50) operates at an engine cooling mode (see FIG. 7). The variable cooling apparatus (50) may return the cooling water flowing out of the device water circulation circuit (31) to the device water circulation circuit (31) through the second and third radiators (52, 53) and return the cooling water out of the engine water circulation circuit (11) to the engine water circulation circuit (11) through the first radiator (51) when the variable cooling apparatus (50) operates at a device cooling mode (see FIG. 6).

In this aspect of the invention, the electronic control unit (90) may be configured to cause the variable cooling apparatus (50) to operate at the engine cooling mode (see FIG. 7 and the process of the step 1140 in FIG. 11) when the requested ability of the engine cooling water is equal to or larger than the requested ability of the device cooling water (see a determination "No" at the step 1120 in FIG. 11).

In this aspect of the invention, the electronic control unit (90) may be further configured to cause the variable cooling apparatus (50) to operate at the device cooling mode (see FIG. 6 and the process of the step 1130 in FIG. 11) when the requested ability of the device cooling water is larger than the requested ability of the engine cooling water (see a determination "Yes" at the step 1120 in FIG. 11).

According to further another aspect of the invention, the cooling apparatus may comprise a variable cooling apparatus (50) including at least one (51, 52, 53) of the at least three radiators (12, 32, 51, 52, 53) as a common radiator. At least one (12) of the at least three radiators (12, 32, 51, 52, 53) other than the common radiator (51, 52, 53) may be provided in the engine water circulation circuit (11) as an engine radiator (12) for cooling the cooling water flowing in the engine water circulation circuit (11). At least one (32) of the at least three radiators (12, 32, 51, 52, 53) other than the common radiator (51, 52, 53) and the engine radiator (12) may be provided in the device water circulation circuit (31) as a device radiator (32) for cooling the cooling water flowing in the device water circulation circuit (31).

In this aspect of the invention, the variable cooling apparatus (50) may return the cooling water flowing out of the engine water circulation circuit (11) to the engine water circulation circuit (11) through the common radiator (51, 52, 53) and the engine radiator (12) when the variable cooling apparatus (50) operates at an engine cooling mode (see FIG. 7).

In this aspect of the invention, the variable cooling apparatus (50) may return the cooling water flowing out of the device water circulation circuit (31) to the device water circulation circuit (31) through the common radiator (51, 52, 53) and the device radiator (32) when the variable cooling apparatus (50) operates at a device cooling mode (see FIG. 6).

In this aspect of the invention, the electronic control unit (90) may be configured to cause the variable cooling apparatus (50) to operate at the engine cooling mode (see FIG. 7 and the process of the step 1140 in FIG. 11) when the requested ability of the engine cooling water is equal to or larger than the requested ability of the device cooling water (see the determination "No" at the step 1120 in FIG. 11).

In this aspect, the electronic control unit (90) may be further configured to cause the variable cooling apparatus (50) to operate at the device cooling mode (see FIG. 6 and the process of the step 1130 in FIG. 11) when the requested ability of the device cooling water is larger than the requested ability of the engine cooling water (see the determination "Yes" at the step 1120 in FIG. 11).

According to these aspects of the invention, the ability of the engine cooling water to cool the internal combustion engine and the ability of the device cooling water to cool the hybrid device can be changed, depending on the requested ability of the engine cooling water and the requested ability of the device cooling water.

In the above description, for facilitating understanding of the present invention, elements of the present invention corresponding to elements of an embodiment described later are denoted by reference symbols used in the description of the embodiment accompanied with parentheses. However, the elements of the present invention are not limited to the elements of the embodiment defined by the reference symbols. The other objects, features and accompanied advantages of the present invention can be easily understood from the description of the embodiment of the present invention along with the drawings.

BRIEF DESCRIPTION OF THE DRAWINGS

FIG. 3A is a view for showing dispensing valves when a first mode control is executed.

FIG. 3B is a view for showing the dispensing valves when a second mode control is executed.

DESCRIPTION OF THE PREFERRED EMBODIMENTS

Figure 1:
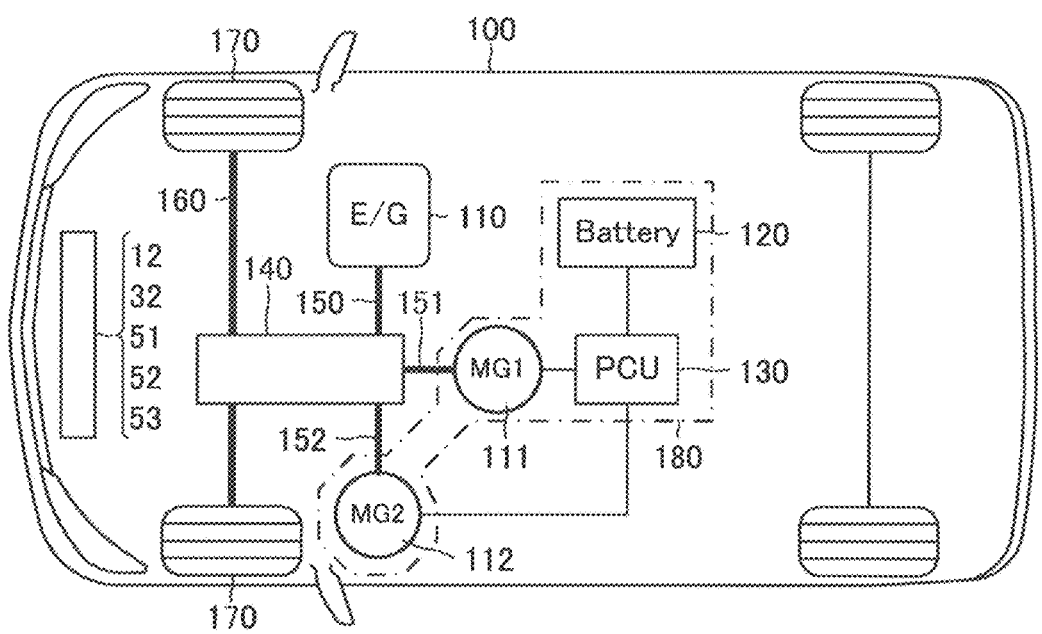
FIG. 1 is a view for showing a hybrid vehicle, to which a cooling apparatus of vehicle driving apparatuses according to an embodiment of the invention is applied.

Below, a cooling apparatus of vehicle driving apparatuses according to an embodiment of the invention will be described with reference to the drawings. The cooling apparatus according to the embodiment is applied to a vehicle 100 shown in FIG. 1. An internal combustion engine 110, a first motor generator 111, a second motor generator 112, a rechargeable battery 120, a power control unit 130, and a power distribution mechanism 140 are mounted on the vehicle 100. Hereinafter, the cooling apparatus according to the embodiment will be referred to as "the embodiment apparatus".

The vehicle 100 is a so-called hybrid vehicle which is driven by power output from the engine 110, the first motor generator 111, and the second motor generator 112.

The vehicle 100, to which the embodiment apparatus is applied, may be a so-called plug-in hybrid vehicle, in which the battery 120 can be charged by an outside electric power source.

The power control unit 130 includes an inverter 190 (see FIG. 2), a boost converter, a DC/DC converter, etc. Hereinafter, the power control unit 130 will be referred to as "the PCU 130".

The power distribution mechanism 140 distributes a torque input to the power distribution mechanism 140 from the engine 110 via an output shaft 150 into a torque for rotating an output shaft of the power distribution mechanism 140 and a torque for driving the first motor generator 111 as an electric generator at a predetermined distribution proportion (with a predetermined distribution property).

The power distribution mechanism 140 transmits the torque input to the power distribution mechanism 140 from the engine 110 and a torque input to the power distribution mechanism 140 from the second motor generator 112 to right and left driving wheels 170 via a wheel drive shaft 160. The power distribution mechanism 140 is known, for example in JP 2013-77026 A, etc.

The first and second motor generators 111 and 112 are permanent magnet synchronous motors, respectively. The first and second motor generators 111 and 112 are electrically connected to the battery 120 via the inverter 190 of the PCU 130.

The first motor generator 111 is operatively connected to the power distribution mechanism 140 via an input/output shaft 151. The first motor generator 111 is mainly used as the electric generator. When the first motor generator 111 is used as the electric generator, a rotation shaft of the first motor generator 111 is rotated by external forces such as a moving energy of the vehicle 100 and the torque output from the engine 110, thereby generating electric power. The generated electric power is charged in the battery 120 via the inverter 190 of the PCU 130.

The first motor generator 111 is also used as an electric motor. When the first motor generator 111 is used as the electric motor, the first motor generator 111 is driven by the electric power supplied thereto from the battery 120 via the inverter 190 of the PCU 130. The output power of the first motor generator 111 is input to the power distribution mechanism 140 via the input/output shaft 151.

The second motor generator 112 is operatively connected to the power distribution mechanism 140 via an input/output shaft 152. The second motor generator 112 is mainly used as an electric motor. When the second motor generator 112 is used as the electric motor, the second motor generator 112 is activated by the electric power supplied thereto from the battery 120 via the inverter 190 of the PCU 130. The output power of the second motor generator 112 is input to the power distribution mechanism 140 via the input/output shaft 152.

The second motor generator 112 is also used as an electric generator. When the second motor generator 112 is used as the electric generator, a rotation shaft of the second motor generator 112 is rotated by the external forces such as the moving energy of the vehicle 100 and the torque output from the engine 110, thereby generating the electric power. The generated electric power is charged in the battery 120 via the inverter 190 of the PCU 130.

Figure 2:
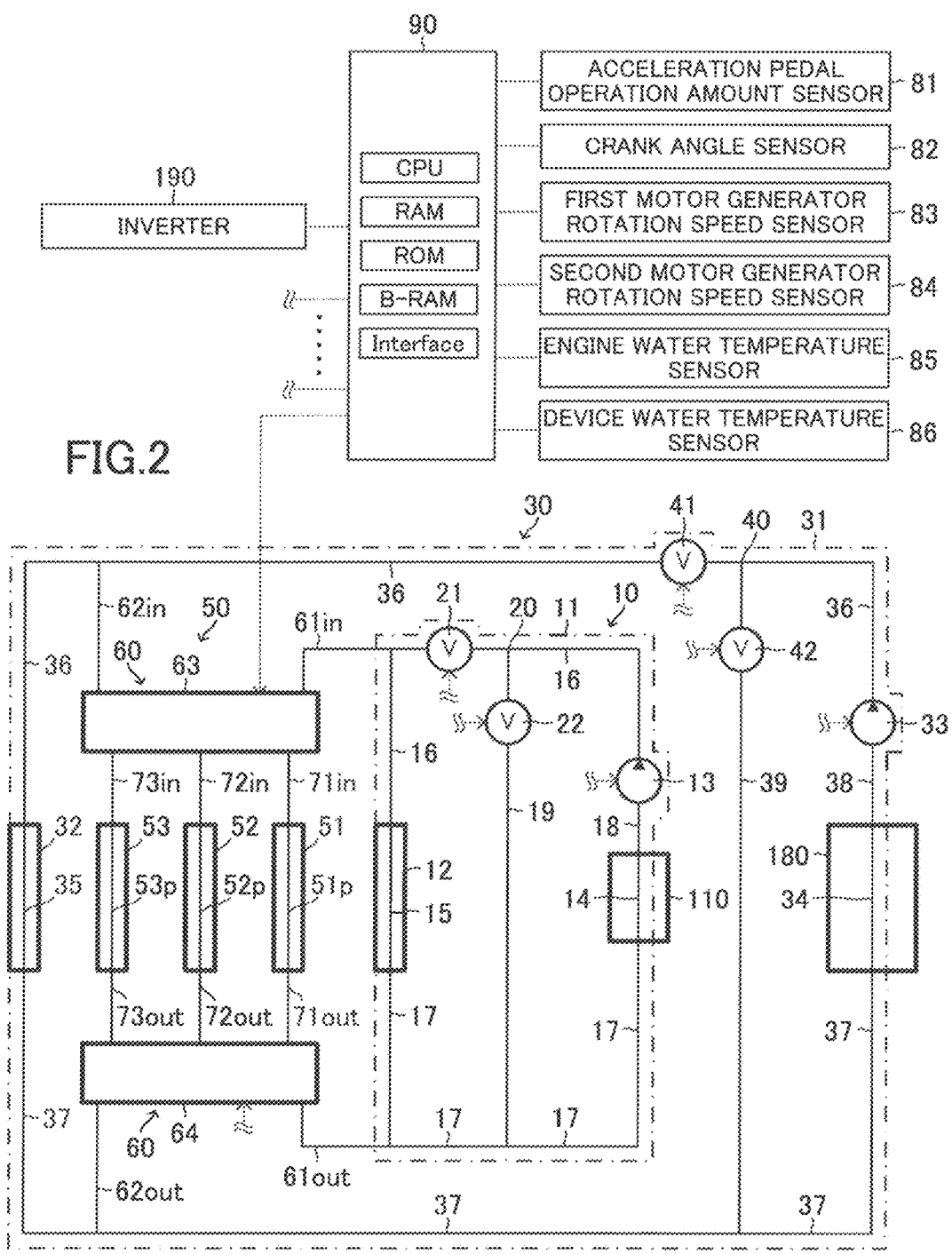
FIG. 2 is a view for showing the cooling apparatus of the vehicle driving apparatuses according to the embodiment of the invention.

As shown in FIG. 2, the inverter 190 of the PCU 130 is electrically connected to an ECU 90. The ECU 90 is an electronic control unit or an electronic control circuit including as a main component a microcomputer including a CPU, a ROM, a RAM, a back-up RAM, an interface, etc. The CPU realizes various functions described later by executing instructions or routines stored in a memory, i.e., the ROM.

An activation of the inverter 190 is controlled by the ECU 90. The ECU 90 controls activations of the first and second motor generators 111 and 112 by controlling the activation of the inverter 190.

<Cooling Apparatus>

As shown in FIG. 2, the embodiment apparatus includes an engine cooling apparatus 10, a device cooling apparatus 30, and a variable cooling apparatus 50.

<Engine Cooling Apparatus>

The engine cooling apparatus 10 includes an engine water circulation circuit 11, an engine radiator 12, and an engine pump 13.

When the engine 110 operates, the engine 110 generates heat. The engine 110 operates optimally when a temperature of the engine 110 is maintained within a predetermined range Wteng which is higher than zero degree Celsius. The engine water circulation circuit 11 is a circuit, through which cooling water flows for controlling the temperature of the engine 110 to a temperature within the predetermined range Wteng. Hereinafter, the temperature of the engine 110 will be referred to as "the engine temperature Teng", and the predetermined range Wteng will be referred to as "the predetermined engine temperature range Wteng".

In this embodiment, the cooling water may be any heat exchanging medium capable of exchanging the heat with the engine 110, exchanging the heat with the outside air at the engine radiator 12, exchanging the heat with a hybrid device 180 described later, exchanging the heat with the outside air with a device radiator 32 described later, and exchanging the heat with the outside air at a first radiator 51, a second radiator 52, and a third radiator 53 described later, respectively. Below, the embodiment apparatus will be described, using the cooling water as the heat exchanging medium.

The engine water circulation circuit 11 is formed of an internal water passage (not shown) of the engine pump 13, an engine internal water passage 14, an engine radiator water passage 15, a first engine water passage 16, a second engine water passage 17, a third engine water passage 18, and an engine bypass water passage 19. The engine internal water passage 14 is a cooling water passage formed in the engine 110. The engine radiator water passage 15 is a cooling water passage formed in the engine radiator 12.

As shown in FIG. 1, the engine radiator 12 is provided in a compartment provided in a front portion of the vehicle 100 such that the outside air flows through the engine radiator 12 while the vehicle 100 moves. The engine radiator 12 discharges the heat of the cooling water flowing through the engine radiator water passage 15 to the outside air flowing through the engine radiator 12, thereby cooling the cooling water.

The first engine water passage 16 is a cooling water passage which connects a cooling water discharging opening of the engine pump 13 to a cooling water inlet of the engine radiator water passage 15. The second engine water passage 17 is a cooling water passage which connects a cooling water outlet of the engine radiator water passage 15 to a cooling water inlet of the engine internal water passage 14. The third engine water passage 18 is a cooling water passage which connects a cooling water outlet of the engine internal water passage 14 to a cooling water suctioning opening of the engine pump 13. The engine bypass water passage 19 is a cooling water passage which connects the first engine water passage 16 to the second engine water passage 17.

An engine radiator valve 21 is provided in the first engine water passage 16 between the engine radiator water passage 15 and a connection portion 20, at which the engine bypass water passage 19 is connected to the first engine water passage 16. The engine radiator valve 21 is electrically connected to the ECU 90. A setting position of the engine radiator valve 21 is controlled by the ECU 90.

When the engine radiator valve 21 is set at an open position by the ECU 90, the cooling water can flow through the engine radiator valve 21. On the other hand, when the engine radiator valve 21 is set at a closed position by the ECU 90, the cooling water cannot flow through the engine radiator valve 21.

An engine bypass valve 22 is provided in the engine bypass water passage 19. The engine bypass valve 22 is electrically connected to the ECU 90. A setting position of the engine bypass valve 22 is controlled by the ECU 90.

When the engine bypass valve 22 is set at an open position by the ECU 90, the cooling water can flow through the engine bypass valve 22. On the other hand, when the engine bypass valve 22 is set at a closed position by the ECU 90, the cooling water cannot flow through the engine bypass valve 22.

<Device Cooling Apparatus>

As shown in FIG. 2, the device cooling apparatus 30 includes a device water circulation circuit 31, the device radiator 32, and a device pump 33.

When the hybrid device 180 including the first motor generator 111, the second motor generator 112, the battery 120, and the PCU 130, activates, the hybrid device 180 generates the heat. The hybrid device 180 operates optimally when a temperature of the hybrid device 180 is maintained within a predetermined range Wtdev which is higher than zero degree Celsius. The device water circulation circuit 31 is a circuit, through which the cooling water flows for controlling the temperature of the hybrid device 180 to a temperature within the predetermined range Wtdev. Hereinafter, the temperature of the hybrid device 180 will be referred to as "the device temperature Tdev", and the predetermined range Wtdev will be referred to as "the predetermined device temperature range Wtdev".

The device water circulation circuit 31 is formed of an internal water passage (not shown) of the device pump 33, a device internal water passage 34, a device radiator water passage 35, a first device water passage 36, a second device water passage 37, a third device water passage 38, and a device bypass water passage 39. The device internal water passage 34 is a cooling water passage formed in the hybrid device 180. The device radiator water passage 35 is a cooling water passage formed in the device radiator 32.

As shown in FIG. 1, the device radiator 32 is provided in the compartment provided in the front portion of the vehicle 100 such that the outside air flows through the device radiator 32 while the vehicle 100 moves. The device radiator 32 discharges the heat of the cooling water flowing through the device radiator water passage 35 to the outside air flowing through the device radiator 32, thereby cooling the cooling water.

The first device water passage 36 is a cooling water passage which connects a cooling water discharging opening of the device pump 33 to a cooling water inlet of the device radiator water passage 35. The second device water passage 37 is a cooling water passage which connects a cooling water outlet of the device radiator water passage 35 to a cooling water inlet of the device internal water passage 34. The third device water passage 38 is a cooling water passage which connects a cooling water outlet of the device internal water passage 34 to a cooling water suctioning opening of the device pump 33. The device bypass water passage 39 is a cooling water passage which connects the first device water passage 36 to the second device water passage 37.

A device radiator valve 41 is provided in the first device water passage 36 between the device radiator water passage 35 and a connection portion 40, at which the device bypass water passage 39 is connected to the first device water passage 36. The device radiator valve 41 is electrically connected to the ECU 90. A setting position of the device radiator valve 41 is controlled by the ECU 90.

When the device radiator valve 41 is set at an open position by the ECU 90, the cooling water can flow through the device radiator valve 41. On the other hand, when the device radiator valve 41 is set at a closed position by the ECU 90, the cooling water cannot flow through the device radiator valve 41.

A device bypass valve 42 is provided in the device bypass water passage 39. The device bypass valve 42 is electrically connected to the ECU 90. A setting position of the device bypass valve 42 is controlled by the ECU 90.

When the device bypass valve 42 is set at an open position by the ECU 90, the cooling water can flow through the device bypass valve 42. On the other hand, when the device bypass valve 42 is set at a closed position by the ECU 90, the cooling water cannot flow through the device bypass valve 42.

<Variable Cooling Apparatus>

As shown in FIG. 2, the variable cooling apparatus 50 includes the first radiator 51, the second radiator 52, the third radiator 53, and a water dispensing mechanism 60.

As shown in FIG. 1, the first radiator 51, the second radiator 52, and the third radiator 53 are provided in the compartment provided in the front portion of the vehicle 100 such that the outside air flows through the first radiator 51, the second radiator 52, and the third radiator 53 while the vehicle 100 moves. The first radiator 51, the second radiator 52, and the third radiator 53 discharge the heat of the cooling water flowing through a cooling water passage 51$p$ formed in the first radiator 51, a cooling water passage 52$p$ formed in the second radiator 52, and a cooling water passage 53$p$ formed in the third radiator 53 to the outside air flowing through the first radiator 51, the second radiator 52, and the third radiator 53, thereby cooling the cooling water.

In this embodiment, the third radiator 53 is positioned above the device radiator 32, the second radiator 52 is positioned above the third radiator 53, the first radiator 51 is positioned above the second radiator 52, and the engine radiator 12 is positioned above the first radiator 51. Cooling abilities of the engine radiator 12, the first radiator 51, the second radiator 52, the third radiator 53, and the device radiator 32 are the same. In this regard, the engine radiator 12, the first radiator 51, the second radiator 52, the third radiator 53, and the device radiator 32 may be positioned in a suitable manner, and the cooling abilities of the engine radiator 12, the first radiator 51, the second radiator 52, the third radiator 53, and the device radiator 32 may be different from each other.

The water dispensing mechanism 60 includes an engine water inflow passage 61$in$, an engine water outflow passage 61*out*, a device water inflow passage 62*in*, a device water outflow passage 62*out*, an upstream dispensing valve 63, a downstream dispensing valve 64, a first water inflow passage 71*in*, a second water inflow passage 72*in*, a third water inflow passage 73*in*, a first water outflow passage 71*out*, a second water outflow passage 72*out*, and a third water outflow passage 73*out*.

An end of the engine water inflow passage 61*in* is connected to the first engine water passage 16 downstream of the engine radiator valve 21. The other end of the engine water inflow passage 61*in* is connected to an engine water inlet 63*eng_in* of the upstream dispensing valve 63 (see FIG. 3A).

An end of the device water inflow passage 62*in* is connected to the first device water passage 36 downstream of the device radiator valve 41. The other end of the device water inflow passage 62*in* is connected to a device water inlet 63*dev_in* of the upstream dispensing valve 63 (see FIG. 3A).

An end of the first water inflow passage 71*in* is connected to a first water outlet 631out (see FIG. 3A) of the upstream dispensing valve 63. The other end of the first water inflow passage 71*in* is connected to a water inlet of the water passage 51*p* formed in the first radiator 51. Hereinafter, the water passage 51*p* will be referred to as "the first radiator water passage 51*p*".

An end of the second water inflow passage 72*in* is connected to a second water outlet 632*out* (see FIG. 3A) of the upstream dispensing valve 63. The other end of the second water inflow passage 72*in* is connected to a water inlet of the water passage 52*p* formed in the second radiator 52. Hereinafter, the water passage 52*p* will be referred to as "the second radiator water passage 52*p*".

An end of the third water inflow passage 73*in* is connected to a third water outlet 633*out* (see FIG. 3A) of the upstream dispensing valve 63. The other end of the third water inflow passage 73*in* is connected to a water inlet of the water passage 53*p* formed in the third radiator 53. Hereinafter, the water passage 53*p* will be referred to as "the third radiator water passage 53*p*".

An end of the first water outflow passage 71*out* is connected to a water outlet of the first radiator water passage 51*p* of the first radiator 51. The other end of the first water outflow passage 71*out* is connected to a first water inlet 641*in* (see FIG. 3A) of the downstream dispensing valve 64.

An end of the second water outflow passage 72*out* is connected to a water outlet of the second radiator water passage 52*p* of the second radiator 52. The other end of the second water outflow passage 72*out* is connected to a second water inlet 642*in* (see FIG. 3A) of the downstream dispensing valve 64.

An end of the third water outflow passage 73*out* is connected to a water outlet of the third radiator water passage 53*p* of the third radiator 53. The other end of the third water outflow passage 73*out* is connected to a third water inlet 643*in* (see FIG. 3A) of the downstream dispensing valve 64.

An end of the engine water outflow passage 61out is connected to an engine water outlet 64*eng_out* (see FIG. 3A) of the downstream dispensing valve 64. The other end of the engine water outflow passage 61out is connected to the second engine water passage 17.

An end of the device water outflow passage 62*out* is connected to a device water outlet 64*dev_out* (see FIG. 3A) of the downstream dispensing valve 64. The other end of the device water outflow passage 62*out* is connected to the second device water passage 37.

The upstream dispensing valve 63 and the downstream dispensing valve 64 are electrically connected to the ECU 90. Setting positions of valve bodies 63*v* of the upstream dispensing valve 63 and valve bodies 64*v* of the downstream dispensing valve 64 (see FIG. 3A) are controlled by the ECU 90.

<First Mode>

As shown in FIG. 3A, the engine water inlet 63*eng_in* is closed by one of the valve bodies 63*v* of the upstream dispensing valve 63 when the valve bodies 63*v* are set at first positions by the ECU 90. In this case, the cooling water cannot flow into an internal space 63*c* of the upstream dispensing valve 63 through the engine water inlet 63*eng_in*. On the other hand, the device water inlet 63*dev_in* is open and communicates with the first water outlet 631*out*, the second water outlet 632*out*, and the third water outlet 633*out* through the internal space 63*c*. In this case, the cooling water which has flowed into the internal space 63*c* through the device water inlet 63*dev_in*, can flow out from the internal space 63*c* through the first water outlet 631out, the second water outlet 632*out*, and the third water outlet 633*out*. Hereinafter, the internal space 63*c* of the upstream dispensing valve 63 will be referred to as "the upstream dispensing chamber 63*c*".

As shown in FIG. 3A, the engine water outlet 64*eng_out* is closed by one of the valve bodies 64*v* of the downstream dispensing valve 64 when the valve bodies 64*v* are set at first positions by the ECU 90. In this case, the cooling water cannot flow out from an internal space 64*c* of the downstream dispensing valve 64 through the engine water outlet 64*eng_out*. On the other hand, the device water outlet 64*dev_out* is open and communicates with the first water inlet 641*in*, the second water inlet 642*in*, and the third water inlet 643*in* through the internal space 64*c*. In this case, the cooling water which has flowed into the internal space 64*c* through the first water inlet 641*in*, the second water inlet 642*in*, and the third water inlet 643*in*, can flow out from the internal space 64*c* through the device water outlet 64*dev_out*. Hereinafter, the internal space 64*c* of the downstream dispensing valve 64 will be referred to as "the downstream dispensing chamber 64*c*".

Figure 5:
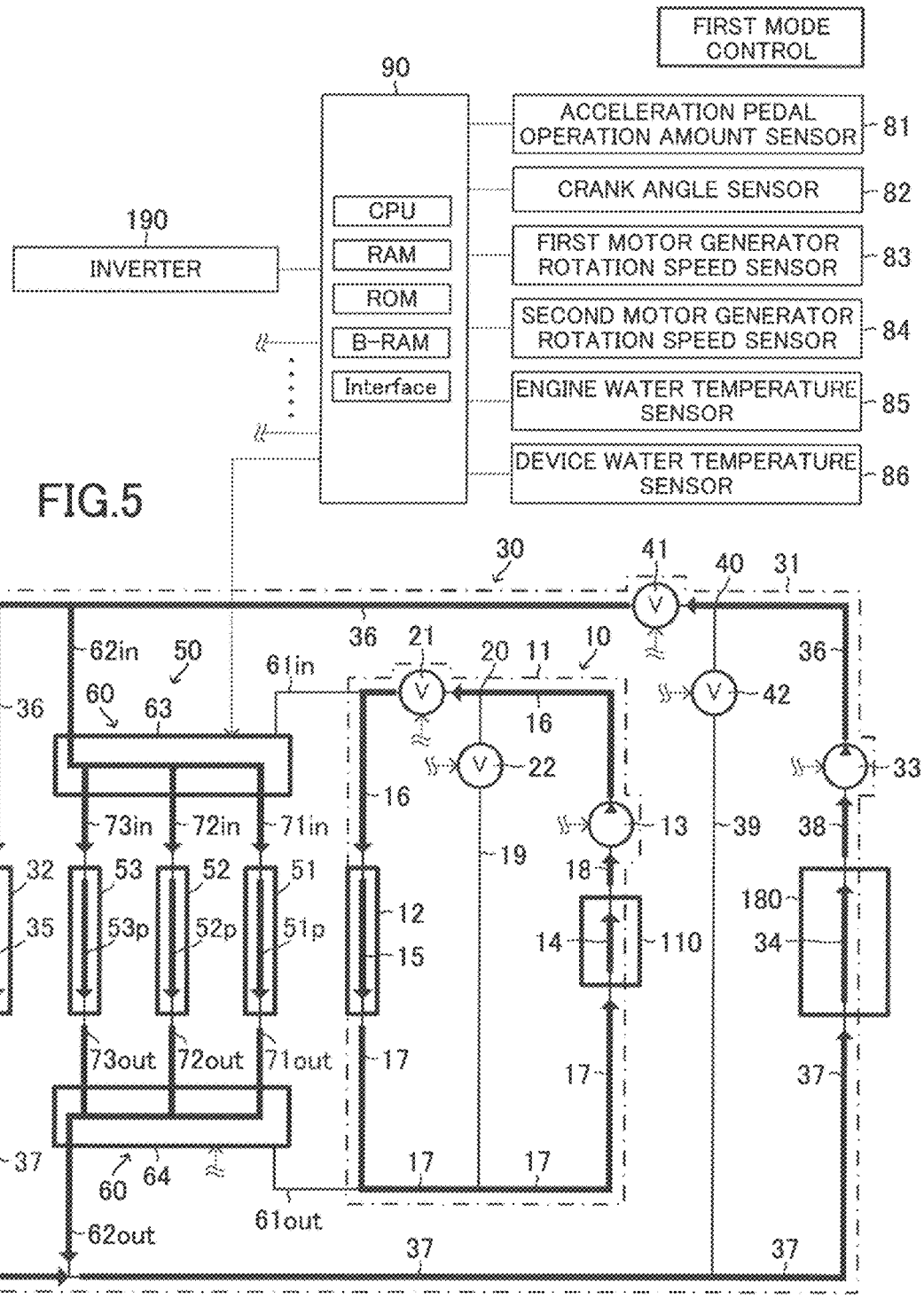
FIG. 5 is a view similar to FIG. 2 and which shows flows of cooling water when the first mode control is executed.

When the upstream dispensing valve 63 and the downstream dispensing valve 64 are set at the first positions, respectively while the engine pump 13 and the device pump 33 are activated, the engine radiator valve 21 and the device radiator valve 41 are set at the open positions, respectively, and the engine bypass valve 22 and the device bypass valve 42 are set at the closed positions, respectively, the cooling water flows as shown in FIG. 5.

In particular, the cooling water discharged from the engine pump 13 flows into the engine radiator water passage 15 through the first engine water passage 16. The cooling water is cooled by the outside air while the cooling water flows through the engine radiator water passage 15. The cooling water flows into the engine internal water passage 14 through the second engine water passage 17 after the cooling water flows through the engine radiator water passage 15. The cooling water cools the engine 110 while the cooling water flows through the engine internal water passage 14. The cooling water flows through the third engine water passage 18 after the cooling water flows through the engine internal water passage 14. Then, the cooling water is suctioned into the engine pump 13.

In this case, the cooling water supplied to the engine internal water passage 14 is cooled only by the engine radiator 12.

A part of the cooling water discharged from the device pump 33 flows into the upstream dispensing chamber 63c of the upstream dispensing valve 63 through the first device water passage 36 and the device water inflow passage 62in. The cooling water flows through the upstream dispensing chamber 63c and then, flows into the first radiator water passage 51p, the second radiator water passage 52p, and the third radiator water passage 53p through the first water inflow passage 71in, the second water inflow passage 72in, and the third water inflow passage 73in, respectively. The cooling water is cooled by the outside air while the cooling water flows through the first radiator water passage 51p, the second radiator water passage 52p, and the third radiator water passage 53p.

The cooling water flows into the downstream dispensing chamber 64c of the downstream dispensing valve 64 through the first water outflow passage 71out, the second water outflow passage 72out, and the third water outflow passage 73out after the cooling water flows through the first radiator water passage 51p, the second radiator water passage 52p, and the third radiator water passage 53p. The cooling water flows through the downstream dispensing chamber 64c and then, flows into the device internal water passage 34 through the device water outflow passage 62out and the second device water passage 37. The cooling water cools the hybrid device 180 while the cooling water flows through the device internal water passage 34. The cooling water flows through the third device water passage 38 after the cooling water flows through the device internal water passage 34. Then, the cooling water is suctioned into the device pump 33.

The remaining of the cooling water discharged from the device pump 33 flows into the device radiator water passage 35 through the first device water passage 36. The cooling water is cooled by the outside air while the cooling water flows through the device radiator water passage 35. The cooling water flows into the device internal water passage 34 through the second device water passage 37 after the cooling water flows through the device radiator water passage 35. The cooling water cools the hybrid device 180 while the cooling water flows through the device internal water passage 34. The cooling water flows through the third device water passage 38 after the cooling water flows through the device internal water passage 34. Then, the cooling water is suctioned into the device pump 33.

In this case, the cooling water supplied to the device internal water passage 34 is cooled by the device radiator 32, the first radiator 51, the second radiator 52, and the third radiator 53.

<Second Mode>

As shown in FIG. 3B, the engine water inlet 63eng_in is open and communicates with the first water outlet 631out through the upstream dispensing chamber 63c when the valve bodies 63v of the upstream dispensing valve 63 are set at second positions by the ECU 90. In this case, the cooling water which has flowed into the upstream dispensing chamber 63c through the engine water inlet 63eng_in, can flow out from the upstream dispensing chamber 63c through the engine water inlet 63eng_in. Also, the device water inlet 63dev_in is open and communicates with the second water outlet 632out and the third water outlet 633out through the upstream dispensing chamber 63c. In this case, the cooling water which has flowed into the upstream dispensing chamber 63c through the device water inlet 63dev_in, can flow out from the upstream dispensing chamber 63c through the second water outlet 632out and the third water outlet 633out.

As shown in FIG. 3B, the engine water outlet 64eng_out is open and communicates with the first water inlet 641in through the downstream dispensing chamber 64c when the valve bodies 64v of the downstream dispensing valve 64 are set at second positions by the ECU 90. In this case, the cooling water which has flowed into the downstream dispensing chamber 64c through the first water inlet 641in, can flow out from the downstream dispensing chamber 64c through the engine water outlet 64eng_out. Also, the device water outlet 64dev_out is open and communicates with the second water inlet 642in and the third water inlet 643in through the downstream dispensing chamber 64c. In this case, the cooling water which has flowed into the downstream dispensing chamber 64c through the second water inlet 642in and the third water inlet 643in, can flow out from the downstream dispensing chamber 64c through the device water outlet 64dev_out.

Figure 6:
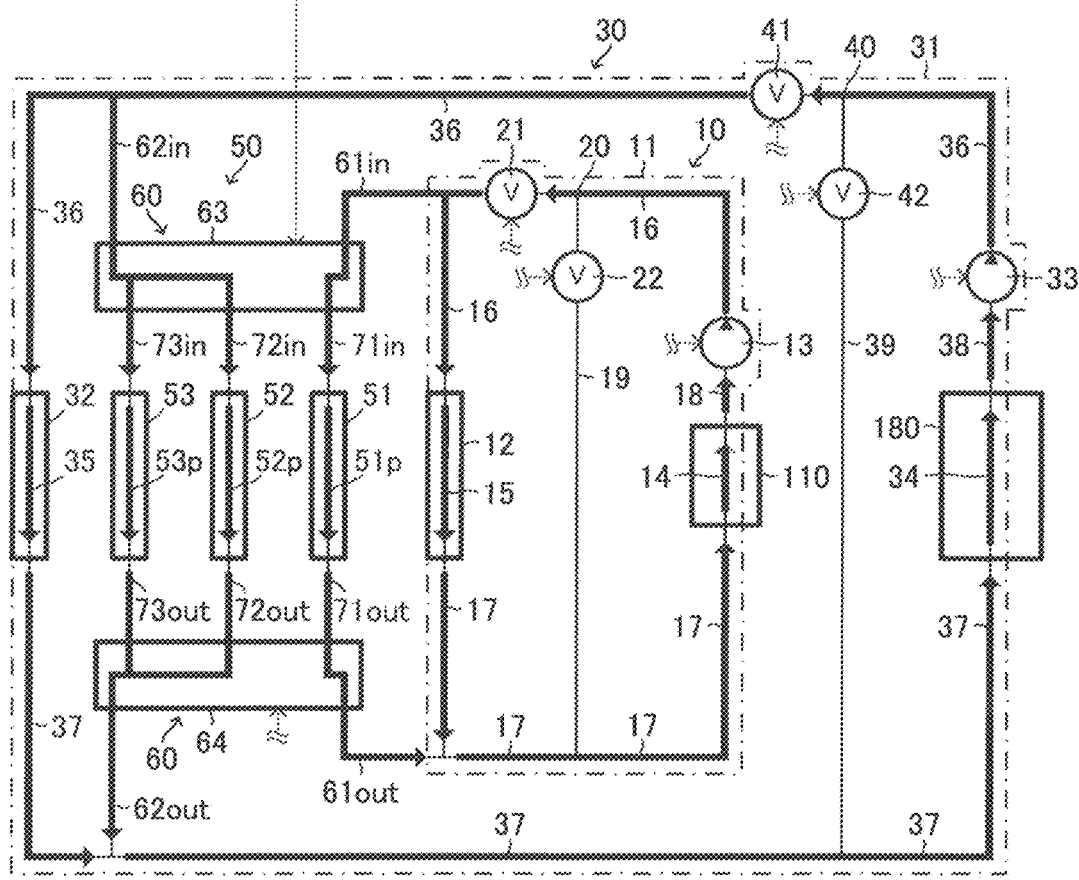
FIG. 6 is a view similar to FIG. 2 and which shows the flows of the cooling water when the second mode control is executed.

When the upstream dispensing valve 63 and the downstream dispensing valve 64 are set at the second positions, respectively while the engine pump 13 and the device pump 33 are activated, the engine radiator valve 21 and the device radiator valve 41 are set at the open positions, respectively, and the engine bypass valve 22 and the device bypass valve 42 are set at the closed positions, respectively, the cooling water flows as shown in FIG. 6.

In particular, a part of the cooling water discharged from the engine pump 13 flows into the upstream dispensing chamber 63c of the upstream dispensing valve 63 through the first engine water passage 16 and the engine water inflow passage 61in. The cooling water flows through the upstream dispensing chamber 63c and then, flows into the first radiator water passage 51p through the first water inflow passage 71in. The cooling water is cooled by the outside air while the cooling water flows through the first radiator water passage 51p.

The cooling water flows into the downstream dispensing chamber 64c of the downstream dispensing valve 64 through the first water outflow passage 71out after the cooling water flows through the first radiator water passage 51p. The cooling water flows through the downstream dispensing chamber 64c and then, flows into the engine internal water passage 14 through the engine water outflow passage 61out and the second engine water passage 17. The cooling water cools the engine 110 while the cooling water flows through the engine internal water passage 14. The cooling water flows through the third engine water passage 18 after the cooling water flows through the engine internal water passage 14. Then, the cooling water is suctioned into the engine pump 13.

The remaining of the cooling water discharged from the engine pump 13 flows in the engine water circulation circuit 11 in a manner described with reference to FIG. 5.

In this case, the cooling water supplied to the engine internal water passage 14 is cooled by the engine radiator 12 and the first radiator 51.

A part of the cooling water discharged from the device pump 33 flows into the upstream dispensing chamber 63c of the upstream dispensing valve 63 through the first device water passage 36 and the device water inflow passage 62in. The cooling water flows through the upstream dispensing chamber 63c and then, flows into the second radiator water passage 52p and the third radiator water passage 53p through the second water inflow passage 72in and the third water inflow passage 73in, respectively. The cooling water is cooled by the outside air while the cooling water flows through the second radiator water passage 52p and the third radiator water passage 53p.

The cooling water flows into the downstream dispensing chamber 64c of the downstream dispensing valve 64 through the second water outflow passage 72*out* and the third water outflow passage 73*out* after the cooling water flows through the second radiator water passage 52*p* and the third radiator water passage 53*p*. The cooling water flows through the downstream dispensing chamber 64*c* and then, flows into the device internal water passage 34 through the device water outflow passage 62*out* and the second device water passage 37. The cooling water cools the hybrid device 180 while the cooling water flows through the device internal water passage 34. The cooling water flows through the third device water passage 38 after the cooling water flows through the device internal water passage 34. Then, the cooling water is suctioned into the device pump 33.

The remaining of the cooling water discharged from the device pump 33 flows in the device water circulation circuit 31 in a manner described with reference to FIG. 5.

In this case, the cooling water supplied to the device internal water passage 34 is cooled by the device radiator 32, the second radiator 52, and the third radiator 53.

<Third Mode>

Figure 4A:
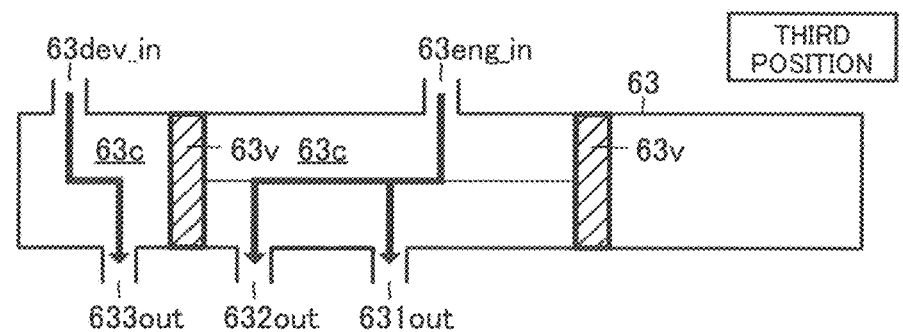
FIG. 4A is a view for showing the dispensing valves when a third mode control is executed.
Figure 4A:
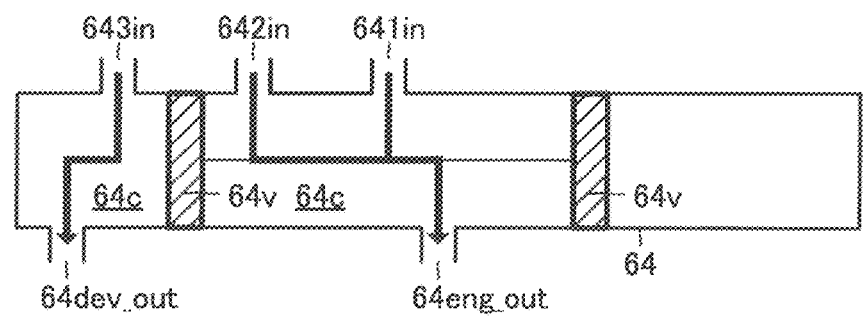

As shown in FIG. 4A, the engine water inlet 63*eng_in* is open and communicates with the first water outlet 631*out* and the second water outlet 632*out* through the upstream dispensing chamber 63*c* when the valve bodies 63*v* of the upstream dispensing valve 63 are set at third positions by the ECU 90. In this case, the cooling water which has flowed into the upstream dispensing chamber 63*c* through the engine water inlet 63*eng_in*, can flow out from the upstream dispensing chamber 63*c* through the first water outlet 631*out* and the second water outlet 632*out*. Also, the device water inlet 63*dev_in* is open and communicates with the third water outlet 633*out* through the upstream dispensing chamber 63*c*. In this case, the cooling water which has flowed into the upstream dispensing chamber 63*c* through the device water inlet 63*dev_in*, can flow out from the upstream dispensing chamber 63*c* through the third water outlet 633*out*.

As shown in FIG. 4A, the engine water outlet 64*eng_out* is open and communicates with the first water inlet 641*in* and the second water inlet 642*in* through the downstream dispensing chamber 64*c* when the valve bodies 64*v* of the downstream dispensing valve 64 are set at third positions by the ECU 90. In this case, the cooling water which has flowed into the downstream dispensing chamber 64*c* through the first water inlet 641*in* and the second water inlet 642*in*, can flow out from the downstream dispensing chamber 64*c* through the engine water outlet 64*eng_out*. Also, the device water outlet 64*dev_out* is open and communicates with the third water inlet 643*in* through the downstream dispensing chamber 64*c*. In this case, the cooling water which has flowed into the downstream dispensing chamber 64*c* through the third water inlet 643*in*, can flow out from the downstream dispensing chamber 64*c* through the device water outlet 64*dev_out*.

Figure 7:
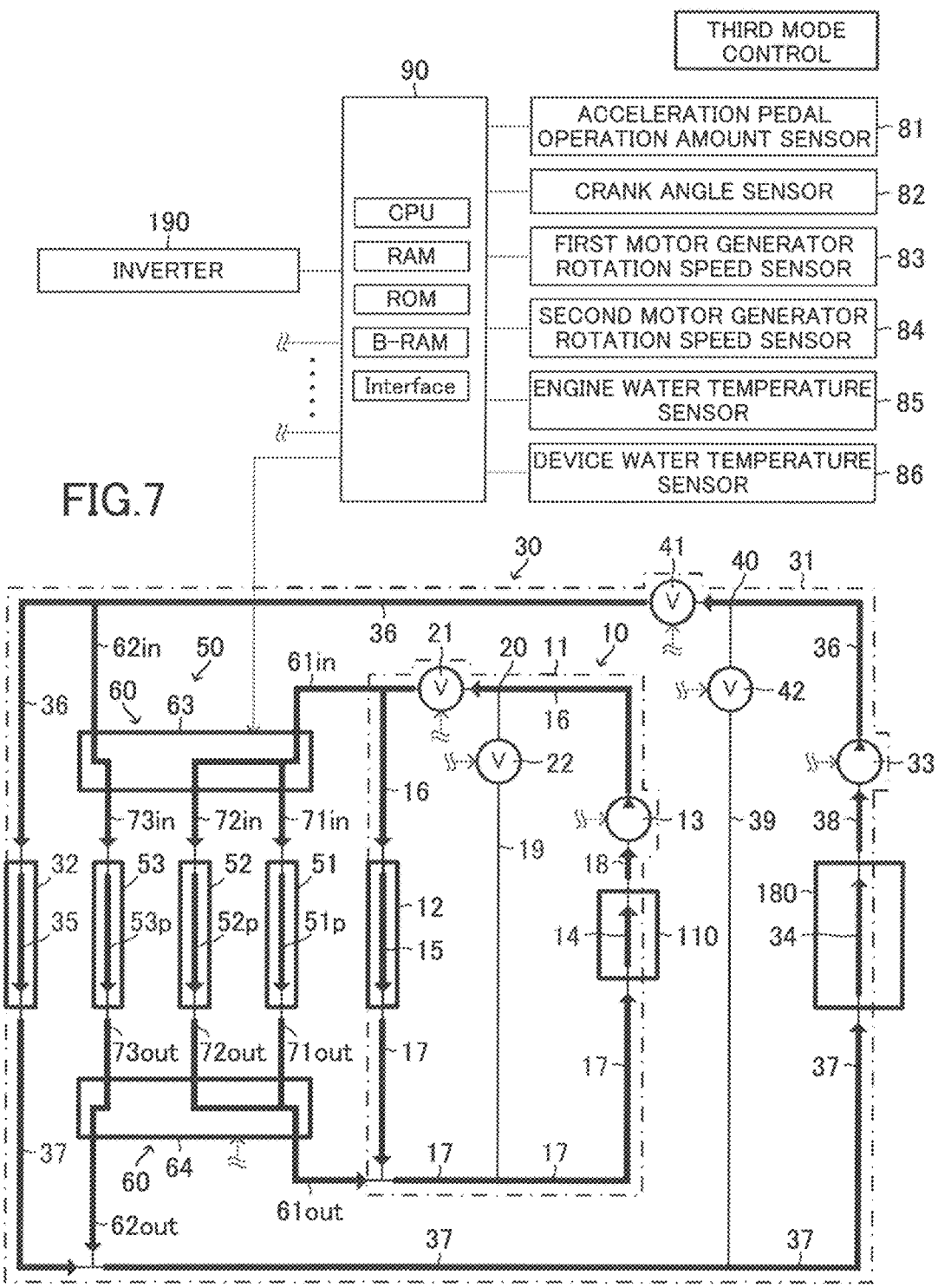
FIG. 7 is a view similar to FIG. 2 and which shows the flows of the cooling water when the third mode control is executed.

When the upstream dispensing valve 63 and the downstream dispensing valve 64 are set at the third positions, respectively while the engine pump 13 and the device pump 33 are activated, the engine radiator valve 21 and the device radiator valve 41 are set at the open positions, respectively, and the engine bypass valve 22 and the device bypass valve 42 are set at the closed positions, respectively, the cooling water flows as shown in FIG. 7.

In particular, a part of the cooling water discharged from the engine pump 13 flows into the upstream dispensing chamber 63*c* of the upstream dispensing valve 63 through the first engine water passage 16 and the engine water inflow passage 61*in*. The cooling water flows through the upstream dispensing chamber 63*c* and then, flows into the first radiator water passage 51*p* and the second radiator water passage 52*p* through the first water inflow passage 71*in* and the second water inflow passage 72*in*. The cooling water is cooled by the outside air while the cooling water flows through the first radiator water passage 51*p* and the second radiator water passage 52*p*.

The cooling water flows into the downstream dispensing chamber 64*c* of the downstream dispensing valve 64 through the first water outflow passage 71*out* and the second water outflow passage 72*out* after the cooling water flows through the first radiator water passage 51*p* and the second radiator water passage 52*p*. The cooling water flows through the downstream dispensing chamber 64*c* and then, flows into the engine internal water passage 14 through the engine water outflow passage 61*out* and the second engine water passage 17. The cooling water cools the engine 110 while the cooling water flows through the engine internal water passage 14. The cooling water flows through the third engine water passage 18 after the cooling water flows through the engine internal water passage 14. Then, the cooling water is suctioned into the engine pump 13.

The remaining of the cooling water discharged from the engine pump 13 flows in the engine water circulation circuit 11 in the manner described with reference to FIG. 5.

In this case, the cooling water supplied to the engine internal water passage 14 is cooled by the engine radiator 12, the first radiator 51, and the second radiator 52.

A part of the cooling water discharged from the device pump 33 flows into the upstream dispensing chamber 63*c* of the upstream dispensing valve 63 through the first device water passage 36 and the device water inflow passage 62*in*. The cooling water flows through the upstream dispensing chamber 63*c* and then, flows into the third radiator water passage 53*p* through the third water inflow passage 73*in*. The cooling water is cooled by the outside air while the cooling water flows through the third radiator water passage 53*p*.

The cooling water flows into the downstream dispensing chamber 64*c* of the downstream dispensing valve 64 through the third water outflow passage 73*out* after the cooling water flows through the third radiator water passage 53*p*. The cooling water flows through the downstream dispensing chamber 64*c* and then, flows into the device internal water passage 34 through the device water outflow passage 62*out* and the second device water passage 37. The cooling water cools the hybrid device 180 while the cooling water flows through the device internal water passage 34. The cooling water flows through the third device water passage 38 after the cooling water flows through the device internal water passage 34. Then, the cooling water is suctioned into the device pump 33.

The remaining of the cooling water discharged from the device pump 33 flows in the device water circulation circuit 31 in the manner described with reference to FIG. 5.

In this case, the cooling water supplied to the device internal water passage 34 is cooled by the device radiator 32 and the third radiator 53.

<Fourth Mode>

Figure 4B:
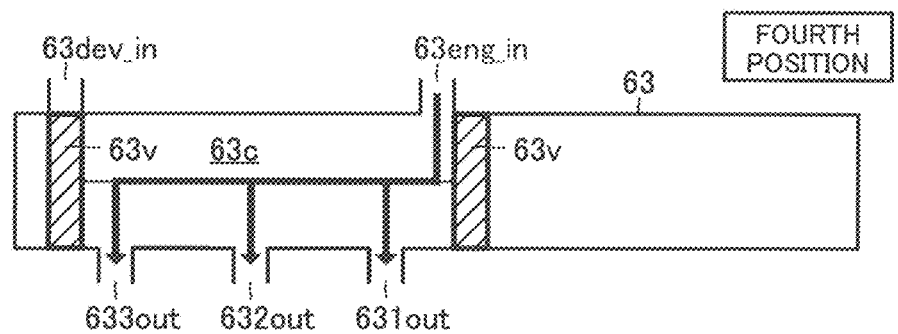
FIG. 4B is a view for showing the dispensing valves when a fourth mode control is executed.
Figure 4B:
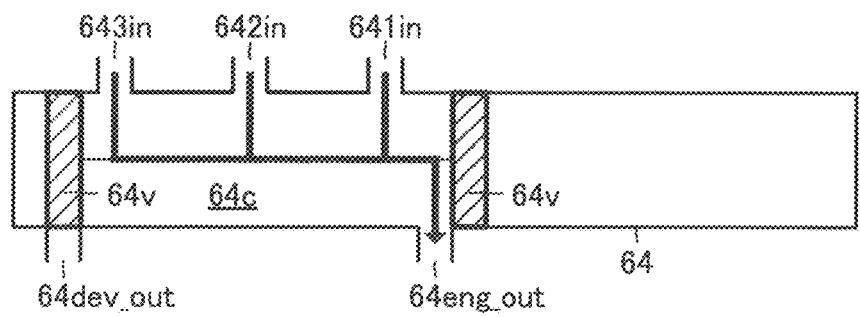

As shown in FIG. 4B, the engine water inlet 63*eng_in* is open and communicates with the first water outlet 631*out*, the second water outlet 632*out*, and the third water outlet 633*out* through the upstream dispensing chamber 63*c* when the valve bodies 63*v* of the upstream dispensing valve 63 are set at fourth positions by the ECU 90. In this case, the cooling water which has flowed into the upstream dispensing chamber 63*c* through the engine water inlet 63*eng_in*, can flow out from the upstream dispensing chamber 63*c* through the first water outlet 631*out*, the second water outlet 632*out*, and the third water outlet 633*out*. On the other hand, the device water inlet 63*dev_in* is closed by one of the valve bodies 63*v* of the upstream dispensing valve 63. In this case, the cooling water cannot flow into the upstream dispensing chamber 63*c* through the device water inlet 63*dev_in*.

As shown in FIG. 4B, the engine water outlet 64*eng_out* is open and communicates with the first water inlet 641*in*, the second water inlet 642*in*, and the third water inlet 643*in* through the downstream dispensing chamber 64*c* when the valve bodies 64*v* of the downstream dispensing valve 64 are set at fourth positions by the ECU 90. In this case, the cooling water which has flowed into the downstream dispensing chamber 64*c* through the first water inlet 641*in*, the second water inlet 642*in*, and the third water inlet 643*in*, can flow out from the downstream dispensing chamber 64*c* through the engine water outlet 64*eng_out*. On the other hand, the device water outlet 64*dev_out* is closed by one of the valve bodies 64*v* of the downstream dispensing valve 64. In this case, the cooling water cannot flow out from the downstream dispensing chamber 64*c* through the device water outlet 64*dev_out*.

Figure 8:
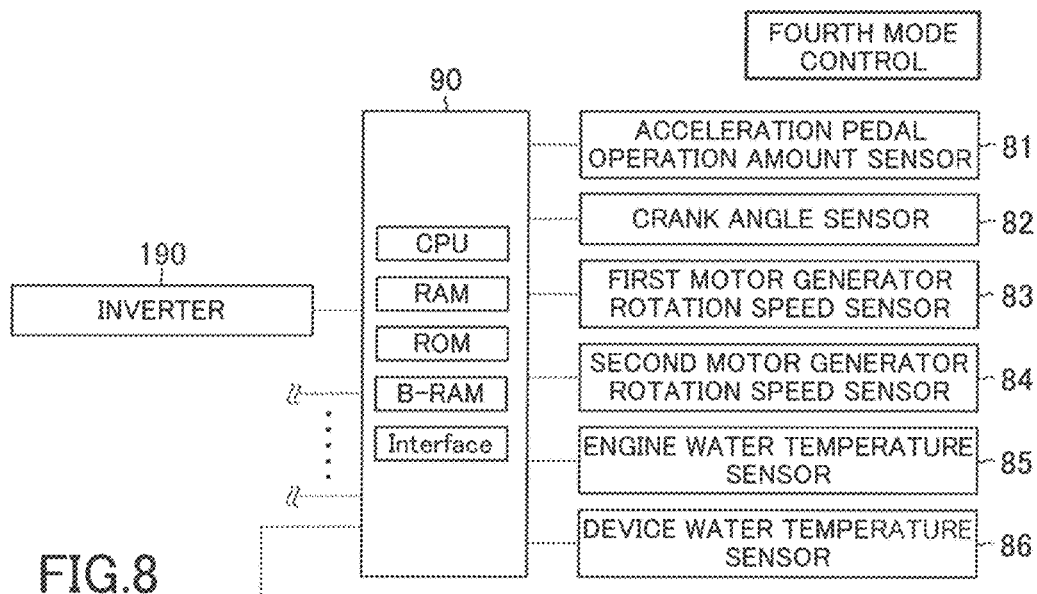
FIG. 8 is a view similar to FIG. 2 and which shows the flows of the cooling water when the fourth mode control is executed.
Figure 8:
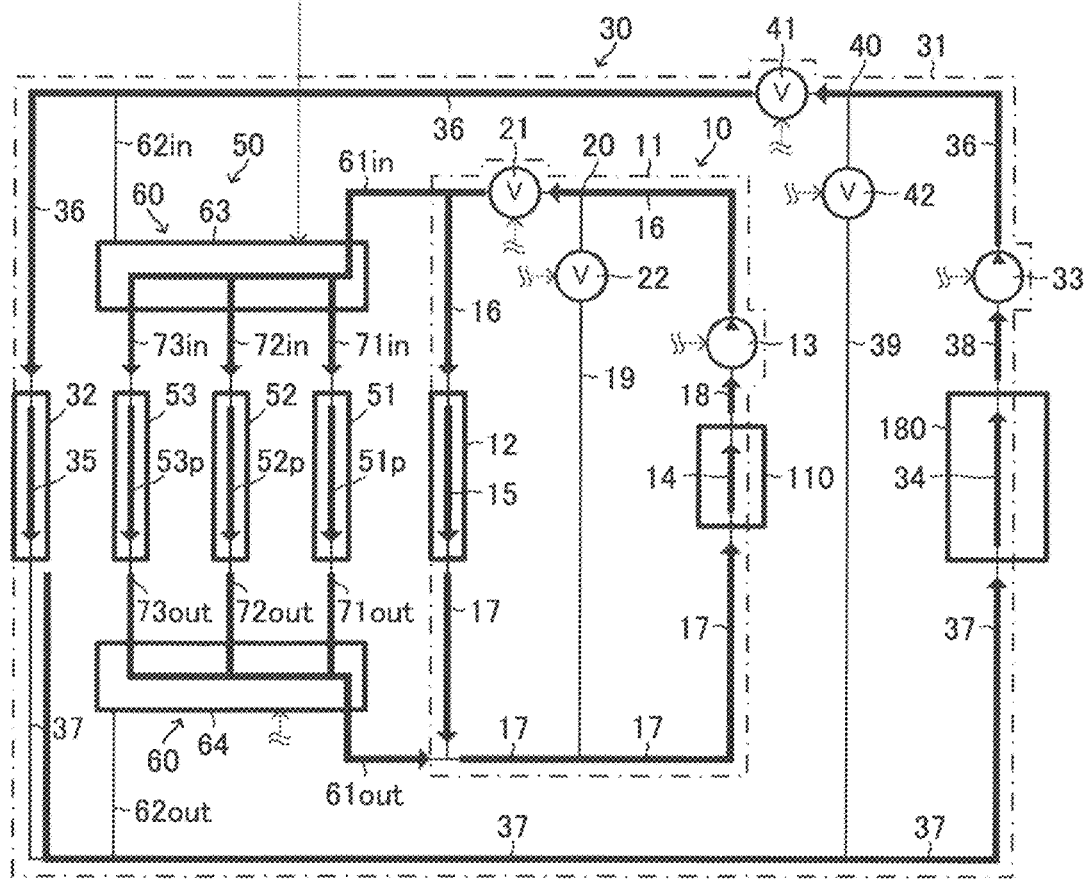

When the upstream dispensing valve 63 and the downstream dispensing valve 64 are set at the fourth positions, respectively while the engine pump 13 and the device pump 33 are activated, the engine radiator valve 21 and the device radiator valve 41 are set at the open positions, respectively, and the engine bypass valve 22 and the device bypass valve 42 are set at the closed positions, respectively, the cooling water flows as shown in FIG. 8.

In particular, a part of the cooling water discharged from the engine pump 13 flows into the upstream dispensing chamber 63*c* of the upstream dispensing valve 63 through the first engine water passage 16 and the engine water inflow passage 61*in*. The cooling water flows through the upstream dispensing chamber 63*c* and then, flows into the first radiator water passage 51*p*, the second radiator water passage 52*p*, and the third radiator water passage 53*p* through the first water inflow passage 71*in*, the second water inflow passage 72*in*, and the third water inflow passage 73*in*. The cooling water is cooled by the outside air while the cooling water flows through the first radiator water passage 51*p*, the second radiator water passage 52*p*, and the third radiator water passage 53*p*.

The cooling water flows into the downstream dispensing chamber 64*c* of the downstream dispensing valve 64 through the first water outflow passage 71*out*, the second water outflow passage 72*out*, and the third water outflow passage 73*out* after the cooling water flows through the first radiator water passage 51*p*, the second radiator water passage 52*p*, and the third radiator water passage 53*p*. The cooling water flows through the downstream dispensing chamber 64*c* and then, flows into the engine internal water passage 14 through the engine water outflow passage 61*out* and the second engine water passage 17. The cooling water cools the engine 110 while the cooling water flows through the engine internal water passage 14. The cooling water flows through the third engine water passage 18 after the cooling water flows through the engine internal water passage 14. Then, the cooling water is suctioned into the engine pump 13.

The remaining of the cooling water discharged from the engine pump 13 flows in the engine water circulation circuit 11 in the manner described with reference to FIG. 5.

In this case, the cooling water supplied to the engine internal water passage 14 is cooled by the engine radiator 12, the first radiator 51, the second radiator 52, and the third radiator 53.

The cooling water discharged from the device pump 33 flows in the device water circulation circuit 31 in the manner described with reference to FIG. 5.

In this case, the cooling water supplied to the device internal water passage 34 is cooled only by the device radiator 32.

<Sensors>

As shown in FIG. 2, an acceleration pedal operation amount sensor 81 is electrically connected to the ECU 90. The acceleration pedal operation amount sensor 81 detects an operation amount AP of an acceleration pedal (not shown) and sends a signal representing the detected operation amount AP to the ECU 90. The ECU 90 acquires the operation amount AP on the basis of the signal sent from the acceleration pedal operation amount sensor 81. In addition, the ECU 90 acquires a load of the engine 110 as an engine load KL on the basis of the acquired operation amount AP.

A crank angle sensor 82 is electrically connected to the ECU 90. The crank angle sensor 82 sends a pulse signal to the ECU 90 each time a crank shaft (not shown) of the engine 110 rotates by a predetermined angle (in this embodiment, 10 degrees). The ECU 90 acquires a rotation speed of the engine 110 as an engine speed NE on the basis of the pulse signal sent from the crank angle sensor 82.

In addition, the ECU 90 acquires an output power of the engine 110 as an engine output power Peng on the basis of the engine load KL and the engine speed NE.

A first motor generator rotation speed sensor 83 is electrically connected to the ECU 90. The first motor generator rotation speed sensor 83 sends a pulse signal to the ECU 90 each time the first motor generator 111 rotates by a predetermined angle. The ECU 90 acquires a rotation speed of the first motor generator 111 as a first motor generator rotation speed NM1 on the basis of the pulse signal sent from the first motor generator rotation speed sensor 83.

A second motor generator rotation speed sensor 84 is electrically connected to the ECU 90. The second motor generator rotation speed sensor 84 sends a pulse signal to the ECU 90 each time the second motor generator 112 rotates by a predetermined angle. The ECU 90 acquires a rotation speed of the second motor generator 112 as a second motor generator rotation speed NM2 on the basis of the pulse signal sent from the second motor generator rotation speed sensor 84.

In addition, the ECU 90 acquires an output power of the first motor generator 111 as a first motor generator output power Pmg1 on the basis of the first motor generator rotation speed NM1 and an output power of the second motor generator 112 as a second motor generator output power Pmg2 on the basis of the second motor generator rotation speed NM2. Moreover, the ECU 90 acquires a sum of the first motor generator output Pmg1 and the second motor generator output Pmg2 as a motor output power Pmotor (=Pmg1+Pmg2).

An engine water temperature sensor 85 is electrically connected to the ECU 90. The engine water temperature sensor 85 is provided so as to detect a temperature TWeng of the cooling water in the first engine water passage 16 between the outlet of the engine internal water passage 14 and the engine pump 13. The engine water temperature sensor 85 sends a signal representing the detected temperature TWeng to the ECU 90. The ECU 90 acquires the temperature TWeng on the basis of the signal sent from the engine water temperature sensor 85. Hereinafter, the temperature TWeng will be referred to as "the engine water temperature TWeng".

A device water temperature sensor 86 is electrically connected to the ECU 90. The device water temperature sensor 86 is provided so as to detect a temperature TWdev of the cooling water in the first device water passage 36 between the outlet of the device internal water passage 34 and the device pump 33. The device water temperature sensor 86 sends a signal representing the detected temperature TWdev to the ECU 90. The ECU 90 acquires the temperature TWdev on the basis of the signal sent from the device water temperature sensor 86. Hereinafter, the temperature TWdev will be referred to as "the device water temperature TWdev".

<Summary of Operation of Embodiment Apparatus>

Next, a summary of an operation of the embodiment apparatus will be described.

<Engine Cooling Request>

The engine 110 operates optimally when the engine temperature Teng is maintained within the predetermined engine temperature range Wteng. The engine water temperature TWeng correlates with the engine temperature Teng. Accordingly, the embodiment apparatus determines that a process of cooling the engine 110 is requested when the engine water temperature TWeng is equal to or higher than a lower limit temperature of a predetermined engine water temperature range Wtweng while the engine 110 operates.

The predetermined engine water temperature range Wtweng is a range of the engine water temperature TWeng which corresponds to the predetermined engine temperature range Wteng. In this embodiment, the predetermined engine water temperature range Wtweng is set previously on the basis of a result of an experiment, etc. Hereinafter, the lower limit temperature of the predetermined engine water temperature range Wtweng will be referred to as "the engine warmed water temperature TWeng_dan".

When the process of cooling the engine 110 is requested, the embodiment apparatus opens the engine radiator valve 21, closes the engine bypass valve 22, and activates the engine pump 13. Thereby, the cooling water cooled at least by the engine radiator 12 is supplied to the engine internal water passage 14. Thus, the engine 110 is cooled by the cooling water.

On the other hand, the embodiment apparatus determines that the process of cooling the engine 110 is not requested when the engine water temperature TWeng is lower than the engine warmed water temperature TWeng_dan while the engine 110 operates.

Figure 9:
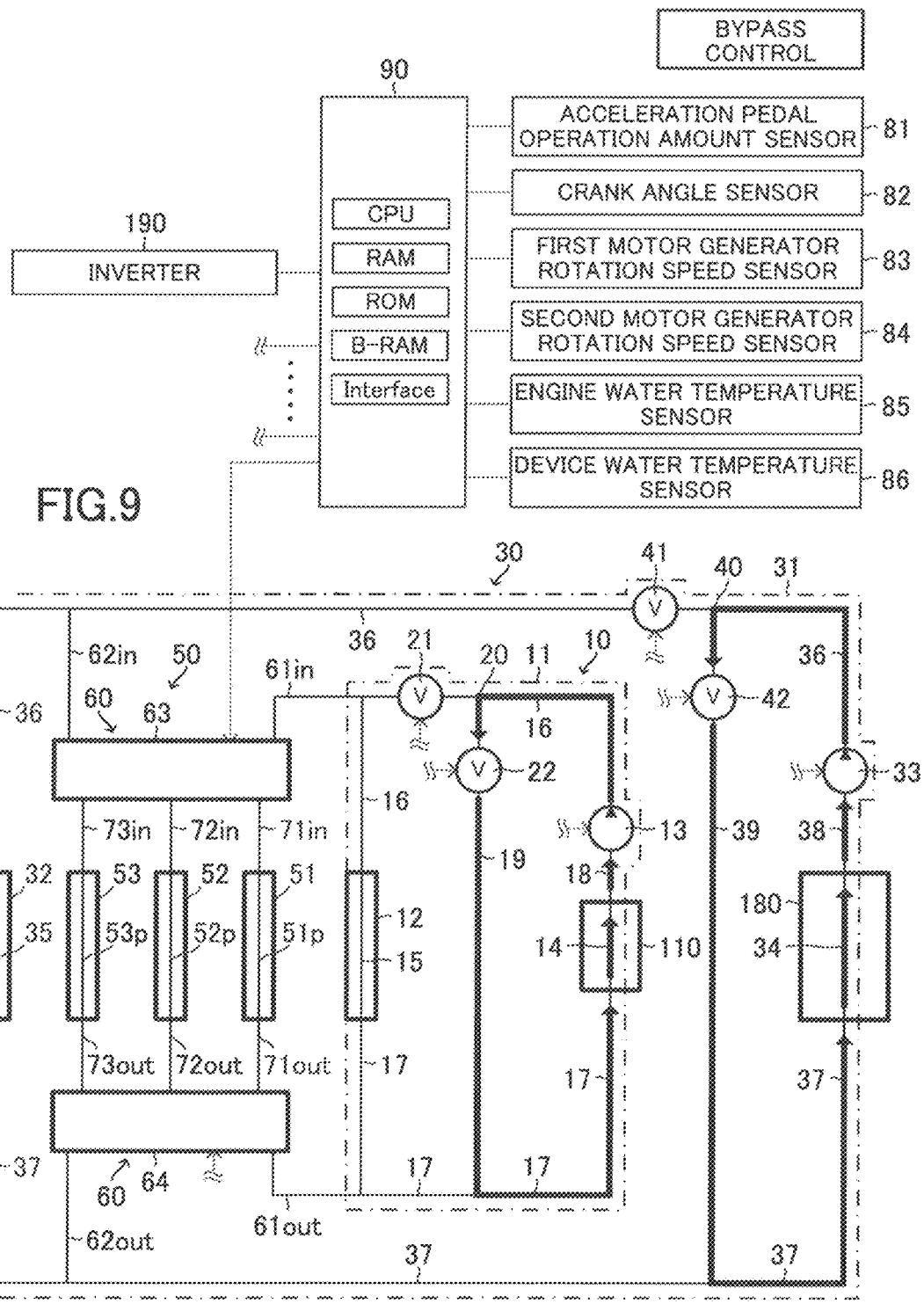
FIG. 9 is a view similar to FIG. 2 and which shows the flows of the cooling water when a bypass control is executed.

When the process of cooling the engine 110 is not requested, the embodiment apparatus closes the engine radiator valve 21, opens the engine bypass valve 22, and activates the engine pump 13. In this case, the cooling water flows as shown in FIG. 9.

In particular, the cooling water discharged from the engine pump 13 flows into the engine internal water passage 14 through the first engine water passage 16, the engine bypass water passage 19, and the second engine water passage 17. The cooling water does not flow through any of the engine radiator water passage 15, the first radiator water passage 51p, the second radiator water passage 52p, and the third radiator water passage 53p. The temperature of the cooling water which has not flowed through the engine radiator water passage 15, etc. is higher than the temperature of the cooling water which has flowed through the engine radiator water passage 15, etc. Therefore, a degree of cooling the engine 110 by the cooling water flowing into the engine internal water passage 14 through the first engine water passage 16, the engine bypass water passage 19, and the second engine water passage 17, is smaller than the degree of cooling the engine 110 by the cooling water flowing into the engine internal water passage 14 through the engine radiator water passage 15, etc. Thus, the engine temperature Teng increases at a large increasing rate.

The cooling water flows through the third engine water passage 18 after the cooling water flows through the engine internal water passage 14. Then, the cooling water is suctioned into the engine pump 13.

Thereby, the cooling water supplied to the engine internal water passage 14 is not cooled by the engine radiator 12, etc. Thus, the engine temperature Teng increases. In other words, the engine 110 is warmed.

<Device Cooling Request>

The hybrid device 180 operates optimally when the device temperature Tdev is maintained within the predetermined device temperature range Wtdev. The device water temperature TWdev correlates with the device temperature Tdev. Accordingly, the embodiment apparatus determines that a process of cooling the hybrid device 180 is requested when the device water temperature TWdev is equal to or higher than a lower limit temperature of a predetermined device water temperature range Wtwdev while the hybrid device 180 operates.

The predetermined device water temperature range Wtwdev is a range of the device water temperature TWdev which corresponds to the predetermined device temperature range Wtdev. In this embodiment, the predetermined device water temperature range Wtwdev is set previously on the basis of a result of an experiment, etc. Hereinafter, the lower limit temperature of the predetermined device water temperature range Wtwdev will be referred to as "the device warmed water temperature TWdev_dan". In this embodiment, the device warmed water temperature TWdev_dan is lower than the engine warmed water temperature TWeng_dan.

When the process of cooling the hybrid device 180 is requested, the embodiment apparatus opens the device radiator valve 41, closes the device bypass valve 42, and activates the device pump 33. Thereby, the cooling water cooled at least by the device radiator 32 is supplied to the device internal water passage 34. Thus, the hybrid device 180 is cooled by the cooling water.

On the other hand, the embodiment apparatus determines that the process of cooling the hybrid device 180 is not requested when the device water temperature TWdev is lower than the device warmed water temperature TWdev_dan while the hybrid device 180 operates.

When the process of cooling the hybrid device 180 is not requested, the embodiment apparatus closes the device radiator valve 41, opens the device bypass valve 42, and activates the device pump 33. In this case, the cooling water flows as shown in FIG. 9.

In particular, the cooling water discharged from the device pump 33 flows into the device internal water passage 34 through the first device water passage 36, the device bypass water passage 39, and the second device water passage 37. The cooling water does not flow through any of the device radiator water passage 35, the first radiator water passage 51p, the second radiator water passage 52p, and the third radiator water passage 53p. The temperature of the cooling water which has not flowed through the device radiator water passage 35, etc. is higher than the temperature of the cooling water which has flowed through the device radiator water passage 35, etc. Therefore, a degree of cooling the hybrid device 180 by the cooling water flowing into the device internal water passage 34 through the first device water passage 36, the device bypass water passage 39, and the second device water passage 37, is smaller than the degree of cooling the hybrid device 180 by the cooling water flowing into the device internal water passage 34 through the device radiator water passage 35, etc. Thus, the device temperature Tdev increases at a large increasing rate.

The cooling water flows through the third device water passage 38 after the cooling water flows through the device internal water passage 34. Then, the cooling water is suctioned into the device pump 33.

Thereby, the cooling water supplied to the device internal water passage 34 is not cooled by the device radiator 32, etc. Thus, the device temperature Tdev increases. In other words, the hybrid device 180 is warmed.

<Dispensing Valve Control>

An amount of the heat generated by the engine 110 is varied, depending on an operation state of the engine 110. Therefore, the cooling water having a high cooling ability should be supplied to the engine internal water passage 14 when the amount of the heat generated by the engine 110 is large.

Accordingly, the embodiment apparatus acquires the engine output Peng and the motor output Pmotor when the engine 110 operates, and the hybrid device 180 operates. When the engine output Peng is smaller than the motor output Pmotor, the embodiment apparatus executes a control for setting the upstream dispensing valve 63 and the downstream dispensing valve 64 at the second positions, respectively as a control for controlling the upstream dispensing valve 63 and the downstream dispensing valve 64. Hereinafter, the control for setting the upstream dispensing valve 63 and the downstream dispensing valve 64 at the second positions, respectively will be referred to as "the second mode control", and the control for controlling the upstream dispensing valve 63 and the downstream dispensing valve 64 will be referred to as "the dispensing valve control".

When the second mode control is executed while the process of cooling the engine 110 is requested, the cooling water flows as shown in FIG. 6. In this case, the cooling water which has flowed through the engine radiator 12 and the first radiator 51, is supplied to the engine internal water passage 14. On the other hand, when the second mode control is executed while the process of cooling the hybrid device 180 is requested, the cooling water which has flowed through the device radiator 32, the second radiator 52, and the third radiator 53, is supplied to the device internal water passage 34.

When the engine output Peng is equal to or larger than the motor output Pmotor while the engine 110 operates, and the hybrid device 180 operates, the embodiment apparatus executes a control for setting the upstream dispensing valve 63 and the downstream dispensing valve 64 at the third positions, respectively as the dispensing valve control. Hereinafter, the control for setting the upstream dispensing valve 63 and the downstream dispensing valve 64 at the third positions, respectively will be referred to as "the third mode control".

When the third mode control is executed while the process of cooling the engine 110 is requested, the cooling water flows as shown in FIG. 7. In this case, the cooling water which has flowed through the engine radiator 12, the first radiator 51, and the second radiator 52, is supplied to the engine internal water passage 14. On the other hand, when the third mode control is executed while the process of cooling the hybrid device 180 is requested, the cooling water which has flowed through the device radiator 32 and the third radiator 53, is supplied to the device internal water passage 34.

While the engine 110 operates, and the hybrid device 180 does not operate, the embodiment apparatus executes a control for setting the upstream dispensing valve 63 and the downstream dispensing valve 64 at the fourth positions, respectively as the dispensing valve control. Hereinafter, the control for setting the upstream dispensing valve 63 and the downstream dispensing valve 64 at the fourth positions, respectively will be referred to as "the fourth mode control".

When the fourth mode control is executed while the process of cooling the engine 110 is requested, the cooling water flows as shown in FIG. 8. In this case, the cooling water which has flowed through the engine radiator 12, the first radiator 51, the second radiator 52, and the third radiator 53, is supplied to the engine internal water passage 14.

While the engine 110 does not operate, and the hybrid device 180 operates, the embodiment apparatus executes a control for setting the upstream dispensing valve 63 and the downstream dispensing valve 64 at the first positions, respectively as the dispensing valve control. Hereinafter, the control for setting the upstream dispensing valve 63 and the downstream dispensing valve 64 at the first positions, respectively will be referred to as "the first mode control".

When the first mode control is executed while the process of cooling the hybrid device 180 is requested, the cooling water flows as shown in FIG. 5. In this case, the cooling water which has flowed through the device radiator 32, the first radiator 51, the second radiator 52, and the third radiator 53, is supplied to the device internal water passage 34.

The amount of the heat generated by the engine 110 increases as the engine output Peng increases. Therefore, an ability of the cooling water supplied to the engine internal water passage 14 to cool the engine 110 is requested, depending on the engine output Peng, to maintain the engine temperature Teng within the predetermined engine temperature range Wteng. Hereinafter, the requested ability of the cooling water supplied to the engine internal water passage 14 to cool the engine 110 will be referred to as "the requested engine cooling ability".

Similarly, the amount of the heat generated by the hybrid device 180 increases as the motor output Pmotor increases. Therefore, an ability of the cooling water supplied to the device internal water passage 34 to cool the hybrid device 180 is requested, depending on the motor output Pmotor, to maintain the device temperature Tdev within the predetermined device temperature range Wtdev. Hereinafter, the requested ability of the cooling water supplied to the device internal water passage 34 to cool the hybrid device 180 will be referred to as "the requested device cooling ability".

Accordingly, it is desired that the number of the radiators used for cooling the cooling water to be supplied to the engine internal water passage 14 and the number of the radiators used for cooling the cooling water to be supplied to the device internal water passage 34 are adjusted, depending on the requested engine and device cooling abilities while the engine 110 operates, and the hybrid device 180 operates.

According to the embodiment apparatus, three radiators are used for cooling the cooling water to be supplied to the engine internal water passage 14 (hereinafter, will be referred to as "the engine cooling water"), and two radiators are used for cooling the cooling water to be supplied to the device internal water passage 34 (hereinafter, will be referred to as "the device cooling water") when the engine output Peng is equal to or larger than the motor output Pmotor, i.e., the requested engine cooling ability is equal to or larger than the requested device cooling ability. Therefore, the number of the radiators used for cooling the engine cooling water, is larger than the number of the radiators used for cooling the device cooling water when the engine output Peng is equal to or larger than the motor output Pmotor, i.e., the requested engine cooling ability is equal to or larger than the requested device cooling ability.

On the other hand, according to the embodiment apparatus, three radiators are used for cooling the device cooling water, and two radiators are used for cooling the engine cooling water when the engine output Peng is smaller than the motor output Pmotor, i.e., the requested engine cooling ability is smaller than the requested device cooling ability. Therefore, the number of the radiators used for cooling the device cooling water, is larger than the number of the radiators used for cooling the engine cooling water when the engine output Peng is smaller than the motor output Pmotor, i.e., the requested engine cooling ability is smaller than the requested device cooling ability.

Therefore, according to the embodiment apparatus, the cooling water having the requested engine cooling ability is supplied to the engine internal water passage 14, and the cooling water having the requested device cooling ability is supplied to the device internal water passage 34. Thus, it can be ensured that the engine temperature Teng is maintained within the predetermined engine temperature range Wteng, and the device temperature Tdev is maintained within the predetermined device temperature range Wtdev while the engine 110 operates, and the hybrid device 180 operates.

When the engine 110 operates, but the hybrid device 180 does not operate, the hybrid device 180 does not need to be cooled. In this case, according to the embodiment apparatus, the maximum number (in this embodiment, four) of the radiators are used for cooling the engine cooling water. Therefore, it can be ensured that the engine temperature Teng is maintained within the predetermined engine temperature range Wteng while the engine 110 operates.

When the hybrid device 180 operates, but the engine 110 does not operate, the engine 110 does not need to be cooled. In this case, according to the embodiment apparatus, the maximum number (in this embodiment, four) of the radiators are used for cooling the device cooling water. Therefore, it can be ensured that the device temperature Tdev is maintained within the predetermined device temperature range Wtdev while the hybrid device 180 operates.

As described above, according to the embodiment apparatus, the number of the radiators used for cooling the engine cooling water and the number of the radiators used for cooling the device cooling water are adjusted, depending on the requested engine and device cooling abilities. Thus, the engine 110 and the hybrid device 180 can be cooled appropriately.

<Concrete Operation of Embodiment Apparatus>

Below, a concrete operation of the embodiment apparatus will be described. The CPU of the ECU 90 of the embodiment apparatus is configured or programmed to execute a routine shown by a flowchart in FIG. 10 each time a predetermined time elapses.

Figure 10:
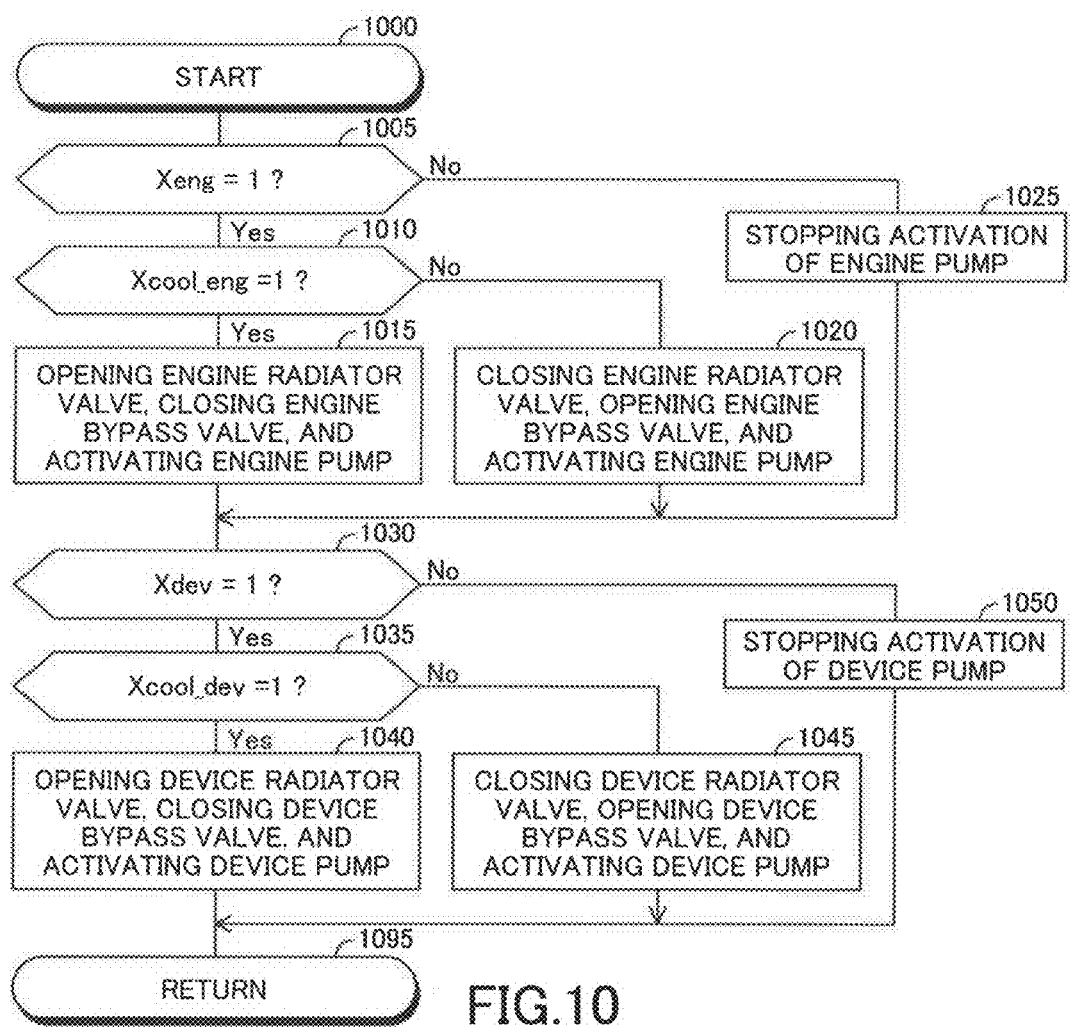
FIG. 10 is a view for showing a flowchart of a routine executed by a CPU of an ECU shown in FIG. 2.

Therefore, at a predetermined timing, the CPU starts a process from a step 1000 in FIG. 10 and then, proceeds with the process to a step 1005 to determine whether a value of an engine operation flag Xeng is "1". The value of the engine operation flag Xeng is set to "1" when the engine 110 starts operating. On the other hand, the value of the engine operation flag Xeng is set to "0" when the engine 110 stops operating.

When the value of the engine operation flag Xeng is "1", the CPU determines "Yes" at the step 1005 and then, proceeds with the process to a step 1010 to determine whether a value of an engine cooling request flag Xcool_eng is "1". The value of the engine cooling request flag Xcool_eng is set to "1" when the process of cooling the engine 110 is requested. On the other hand, the value of the engine cooling request flag Xcool_eng is set to "0" when the process of cooling the engine 110 is not requested, i.e., a process of warming the engine 110 is requested, i.e., a process of increasing the engine temperature Teng is requested.

When the value of the engine cooling request flag Xcool_eng is "1", the CPU determines "Yes" at the step 1010 and then, executes a process of a step 1015 described below. Then, the CPU proceeds with the process to a step 1030.

Step 1015: The CPU sets the engine radiator valve 21 at the open position, sets the engine bypass valve 22 at the closed position, and activates the engine pump 13. Thereby, the cooling water cooled at least by the engine radiator 12 is supplied to the engine internal water passage 14. Thus, the engine 110 is cooled.

When the value of the engine cooling request flag Xcool_eng is "0", the CPU determines "No" at the step 1010 and then, executes a process of a step 1020 described below. Then, the CPU proceeds with the process to the step 1030.

Step 1020: The CPU sets the engine radiator valve 21 at the closed position, sets the engine bypass valve 22 at the open position, and activates the engine pump 13. Thereby, the cooling water not cooled by the engine radiator 12, etc. is supplied to the engine internal water passage 14. Thus, the engine temperature Teng increases.

When the value of the engine operation flag Xeng is "0" at a time of executing a process of the step 1005, the CPU determines "No" at the step 1005 and then, executes a process of a step 1025 described below. Then, the CPU proceeds with the process to the step 1030.

Step 1025: The CPU stops activating the engine pump 13. Thereby, the cooling water does not flow in the engine water circulation circuit 11.

When the CPU proceeds with the process to the step 1030, the CPU determines whether a value of a device operation flag Xdev is "1". The value of the device operation flag Xdev is set to "1" when the hybrid device 180 starts operating. On the other hand, the value of the device operation flag Xdev is set to "0" when the hybrid device 180 stops operating.

When the value of the device operation flag Xdev is "1", the CPU determines "Yes" at the step 1030 and then, proceeds with the process to a step 1035 to determine whether a value of a device cooling request flag Xcool_dev is "1". The value of the device cooling request flag Xcool_dev is set to "1" when the process of cooling the hybrid device 180 is requested. On the other hand, the value of the device cooling request flag Xcool_dev is set to "0" when the process of cooling the hybrid device 180 is not requested, i.e., a process of warming the hybrid device 180 is requested, i.e., a process of increasing the device temperature Tdev is requested.

When the value of the device cooling request flag Xcool_dev is "1", the CPU determines "Yes" at the step 1035 and then, executes a process of a step 1040 described below. Then, the CPU proceeds with the process to a step 1095 to terminate this routine once.

Step 1040: The CPU sets the device radiator valve 41 at the open position, sets the device bypass valve 42 at the closed position, and activates the device pump 33. Thereby, the cooling water cooled at least by the device radiator 32 is supplied to the device internal water passage 34. Thus, the hybrid device 180 is cooled.

When the value of the device cooling request flag Xcool_dev is "0", the CPU determines "No" at the step 1035 and then, executes a process of a step 1045 described below. Then, the CPU proceeds with the process to the step 1095 to terminate this routine once.

Step 1045: The CPU sets the device radiator valve 41 at the closed position, sets the device bypass valve 42 at the open position, and activates the device pump 33. Thereby, the cooling water not cooled by the device radiator 32, etc. is supplied to the device internal water passage 34. Thus, the device temperature Tdev increases.

When the value of the device operation flag Xdev is "0" at a time of executing a process of the step 1030, the CPU determines "No" at the step 1030 and then, executes a process of a step 1050 described below. Then, the CPU proceeds with the process to the step 1095 to terminate this routine once.

Step 1050: The CPU stops activating the device pump 33. Thereby, the cooling water does not flow in the device water circulation circuit 31.

Figure 11:
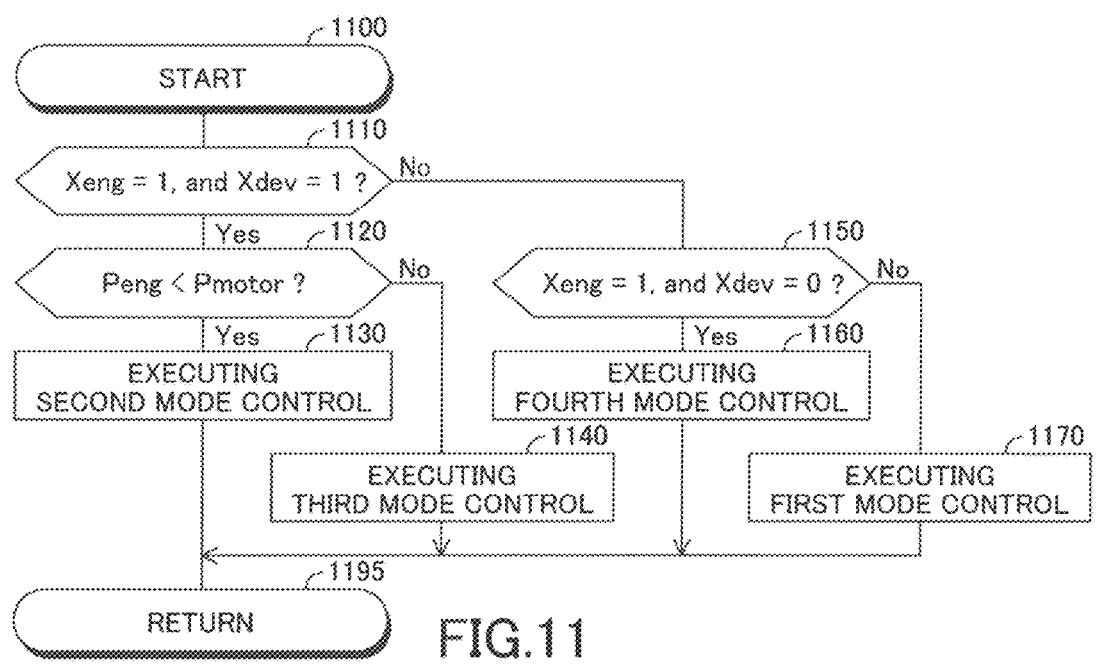
FIG. 11 is a view for showing a flowchart of a routine executed by the CPU.

In addition, the CPU is configured or programmed to execute a routine shown by a flowchart in FIG. 11 each time a predetermined time elapses.

Therefore, at a predetermined timing, the CPU starts a process from a step 1100 in FIG. 11 and then, proceeds with the process to a step 1110 to determine whether the value of the engine operation flag Xeng is "1", and the value of the device operation flag Xdev is "1". When the value of the engine operation flag Xeng is "1", and the value of the device operation flag Xdev is "1", the CPU determines "Yes" at the step 1110 and then, proceeds with the process to a step 1120 to determines whether the engine output Peng is smaller than the motor output Pmotor.

When the engine output Peng is smaller than the motor output Pmotor, the CPU determines "Yes" at the step 1120 and then, executes a process of a step 1130 described below. Then, the CPU proceeds with the process to a step 1195 to terminate this routine once.

Step 1130: The CPU executes the second mode control. Thereby, the cooling water flows in the engine water circulation circuit 11, etc. as shown in FIG. 6 when the process of cooling the engine 110 is requested. In addition, the cooling water flows in the device water circulation circuit 31, etc. as shown in FIG. 6 when the process of cooling the hybrid device 180 is requested.

When the engine output Peng is equal to or larger than the motor output Pmotor, the CPU determines "No" at the step 1120 and then, executes a process of a step 1140 described below. Then, the CPU proceeds with the process to the step 1195 to terminate this routine once.

Step 1140: The CPU executes the third mode control. Thereby, the cooling water flows in the engine water circulation circuit 11, etc. as shown in FIG. 7 when the process of cooling the engine 110 is requested. In addition, the cooling water flows in the device water circulation circuit 31, etc. as shown in FIG. 7 when the process of cooling the hybrid device 180 is requested.

When the value of the engine operation flag Xeng is "0", or the value of the device operation flag Xdev is "0" at a time of executing a process of the step 1110, the CPU determines "No" at the step 1110 and then, proceeds with the process to a step 1150 to determine whether the value of the engine operation flag Xeng is "1", and the value of the device operation flag Xdev is "0".

When the value of the engine operation flag Xeng is "1", and the value of the device operation flag Xdev is "0", the CPU determines "Yes" at the step 1150 and then, executes a process of a step 1160 described below. Then, the CPU proceeds with the process to the step 1195 to terminate this routine once.

Step 1160: The CPU executes the fourth mode control. Thereby, the cooling water flows in the engine water circulation circuit 11, etc. as shown in FIG. 8 when the process of cooling the engine 110 is requested. In addition, the cooling water flows in the device water circulation circuit 31, etc. as shown in FIG. 8 when the process of cooling the hybrid device 180 is requested.

When the value of the engine operation flag Xeng is "0", or the value of the device operation flag Xdev is "1", the CPU determines "No" at the step 1150 and then, executes a process of a step 1170 described below. Then, the CPU proceeds with the process to the step 1195 to terminate this routine once.

Step 1170: The CPU executes the first mode control. Thereby, the cooling water flows in the engine water circulation circuit 11, etc. as shown in FIG. 5 when the process of cooling the engine 110 is requested. In addition, the cooling water flows in the device water circulation circuit 31, etc. as shown in FIG. 5 when the process of cooling the hybrid device 180 is requested.

The concrete operation of the embodiment apparatus has been described. When the embodiment apparatus executes the routines shown in FIGS. 10 and 11, the cooling water having the ability of cooling the engine 110, depending on the requested engine cooling ability, is supplied to the engine internal water passage 14, and the cooling water having the ability of cooling the hybrid device 180, depending on the requested device cooling ability, is supplied to the device internal water passage 34. Thus, the engine 110 and the hybrid device 180 can be cooled appropriately.

It should be noted that the present invention is not limited to the aforementioned embodiment and various modifications can be employed within the scope of the present invention.

Modified Embodiment

For example, when the operation state of the engine 110 changes from a state that the engine 110 operates to a state that the engine 110 does not operate while the hybrid device 180 operates, the embodiment apparatus may change the dispensing valve control from any of the second to fourth mode controls to the first mode control. When the dispensing valve control is changed from any of the second to fourth mode controls to the first mode control, at least one of the first to third radiators 51 to 53 has been used for cooling the engine cooling water until the dispensing valve control is changed. In this case, the at least one of the first to third radiators 51 to 53 which has been used for cooling the engine cooling water until the dispensing valve control is changed, is used for cooling the device cooling water after the dispensing valve control is changed. Hereinafter, the at least one of the first to third radiators 51 to 53 which has been used for cooling the engine cooling water until the dispensing valve control is changed, will be referred to as "the previously-used radiator(s) 51 to 53".

When the dispensing valve control is changed from any of the second to fourth mode controls to the first mode control, the cooling water which has been used for cooling the engine 110, remains in the previously-used radiator(s) 51 to 53. In general, the temperature of the cooling water flowing in the engine water circulation circuit 11, is higher than the temperature of the cooling water flowing in the device water circulation circuit 31. The temperature of the cooling water flowing in the engine water circulation circuit 11, is too high for cooling the hybrid device 180. Accordingly, when the cooling water which has flowed in the engine water circulation circuit 11 until the dispensing valve control is changed, is supplied to the device internal water passage 34, the supplied cooling water cannot cool the hybrid device 180 and may increase the device temperature Tdev.

Therefore, when the dispensing valve control is changed from any of the second to fourth mode controls to the first mode control, and the previously-used radiator(s) 51 to 53 is used for cooling the device cooling water, the cooling water remaining in the previously-used radiator(s) 51 to 53 is supplied to the device internal water passage 34, and the temperature of the cooling water supplied to the device internal water passage 34 may be too high for cooling the hybrid device 180.

In addition, a temperature or temperatures of the previously-used radiator(s) 51 to 53 is/are high. Therefore, when the cooling water to be used for cooling the hybrid device 180 flows through the previously-used radiator(s) 51 to 53, the temperature of the cooling water flowing through the previously-used radiator(s) 51 to 53 may be increased, and the cooling water having the increased temperature may be supplied to the device internal water passage 34.

Further, when an operation state of the hybrid device 180 changes from a state that the hybrid device 180 does not operate to a state that the hybrid device 180 operates while the engine 110 does not operate, the embodiment apparatus starts the first mode control. In this case, the engine 110 may have been cooled shortly before the first mode control is started. In this case, the embodiment apparatus had executed the fourth mode control to cool the engine 110 before the first mode control is started. While the fourth mode control is executed, the first to third radiators 51 to 53 are used for cooling the engine cooling water. Hereinafter, the first to third radiators 51 to 53 which have been used for cooling the engine cooling water shortly before the first mode is started, will be referred to as "the previously-used radiators 51 to 53".

When the operation state of the hybrid device 180 changes from the state that the hybrid device 180 does not operate to the state that the hybrid device 180 operates, the first mode control is started, and the fourth mode control had been executed shortly before the first mode control is started, the cooling water remaining in the previously-used radiators 51 to 53, is supplied to the device internal water passage 34. In addition, the cooling water to be used for cooling the hybrid device 180 flows through the previously-used radiators 51 to 53. In this case, the temperature of the cooling water to be supplied to the device internal water passage 34 may be too high for cooling the hybrid device 180.

Furthermore, when the operation state of the hybrid device 180 changes from the state that the hybrid device 180 does not operate to the state that the hybrid device 180 operates, and the process of cooling the hybrid device 180 is requested while the process of cooling the engine 110 is requested, the embodiment apparatus changes the dispensing valve control from the fourth mode control to the second or third mode control.

In this case, at least one of the first to third radiators 51 to 53 which has been used for cooling the engine cooling water until the dispensing valve control is changed, is used for cooling the device cooling water. Therefore, the temperature of the cooling water to be supplied to the device internal water passage 34 may be too high for cooling the hybrid device 180.

As described above, when the operation state of the engine 110 changes, or the operation state of the hybrid device 180 changes, and the previously-used radiator(s) 51 to 53 or the previously-used radiators 51 to 53, is/are used for cooling the device cooling water, the cooling water having the excessively high temperature may be supplied to the device internal water passage 34.

Accordingly, when a control apparatus according to a modified example (hereinafter, will be referred to as "the modified apparatus") of the embodiment determines that the dispensing valve control should be changed to increase the number of the radiators used for cooling the device cooling water, and the process of cooling the engine 110 is requested, the modified apparatus continues to execute the dispensing valve control now executed. When a predetermined time Tth elapses since no process of cooling the engine 110 was requested, and the process of cooling the engine 110 is stopped, the modified apparatus changes the dispensing valve control in the same manner as the manner of changing the dispensing valve control by the embodiment apparatus.

In this case, the predetermined time Tth is a time capable of decreasing the temperature of the cooling water remaining in the previously-used radiator(s) 51 to 53 or the previously-used radiators 51 to 53 to a temperature which is not too high for cooling the device cooling water, and decreasing the temperature(s) of the previously-used radiator(s) 51 to 53 or the previously-used radiators 51 to 53 to a temperature or temperatures which is/are not too high for cooling the device cooling water. In particular, the predetermined time Tth is set to a suitable time on the basis of a result of an experiment, etc.

Alternatively, the predetermined time Tth may be set on the basis of the temperature of the cooling water remaining in the previously-used radiator(s) 51 to 53 or the previously-used radiators 51 to 53 when the process of cooling the engine 110 is stopped or may be set on the basis of the temperature(s) of the previously-used radiator(s) 51 to 53 or the previously-used radiators 51 to 53 when the process of cooling the engine 110 is stopped. In this case, the predetermined time Tth increases as the temperature of the cooling water remaining in the previously-used radiator(s) 51 to 53 or the previously-used radiators 51 to 53 when the process of cooling the engine 110 is stopped, increases, or as the temperature(s) of the previously-used radiator(s) 51 to 53 or the previously-used radiators 51 to 53 when the process of cooling the engine 110 is stopped, increases. The temperature of the cooling water remaining in the previously-used radiator(s) 51 to 53 or the previously-used radiators 51 to 53 when the process of cooling the engine 110 is stopped, or the temperature(s) of the previously-used radiator(s) 51 to 53 or the previously-used radiators 51 to 53 when the process of cooling the engine 110 is stopped, may be acquired, for example, on the basis of the engine water temperature TWeng when the process of cooling the engine 110 is stopped.

Further, when the modified apparatus determines that the dispensing valve control should be changed to increase the number of the radiators used for cooling the device cooling water, and the process of cooling the engine 110 was requested (i.e., the engine 110 was cooled by the cooling water) until the present time from the predetermined time Tth before, the modified apparatus continues to execute the dispensing valve control now executed. When the predetermined time Tth elapses since no process of cooling the engine 110 was requested, the modified apparatus changes the dispensing valve control in the same manner as the manner of changing the dispending valve control by the embodiment apparatus.

Furthermore, when the modified apparatus determines that the process of cooling the hybrid device 180 should be started, and the process of cooling the engine 110 is requested, the modified apparatus continues to execute the dispensing valve control now executed. When the predetermined time Tth elapses since no process of cooling the engine 110 was requested, the modified apparatus changes the dispensing valve control in the same manner as the manner of changing the dispending valve control by the embodiment apparatus.

Further, when the modified apparatus determines that the process of cooling the hybrid device 180 should be started, no process of cooling the engine 110 is requested, and the process of cooling the engine 110 was requested in a time period between the present time and the predetermined time Tth before, the modified apparatus executes the same dispensing valve control as the dispensing valve control which was executed when the process of cooling the engine 110 was requested lastly. When the predetermined time Tth elapses since no process of cooling the engine 110 was requested lastly, the modified apparatus changes the dispensing valve control in the same manner as the manner of changing the dispensing valve control by the embodiment apparatus.

As described above, the temperature of the cooling water remaining in the previously-used radiator(s) 51 to 53 or the previously-used radiators 51 to 53, is relatively high. Therefore, if the cooling water remaining in the previously-used radiator(s) 51 to 53 or the previously-used radiators 51 to 53, is supplied to the device internal water passage 34, the temperature of the hybrid device 180 may not be maintained within the predetermined device temperature range Wtdev. In addition, the temperature of the previously-used radiator (s) 51 to 53 or the previously-used radiators 51 to 53, is relatively high. Thus, if the cooling water cooled by the previously-used radiator(s) 51 to 53 or the previously-used radiators 51 to 53, is supplied to the device internal water passage 34, the temperature of the hybrid device 180 may not be maintained within the predetermined device temperature range Wtdev.

According to the modified example, when the modified apparatus is about to start cooling the device cooling water by one or more of the first to third radiators 51 to 53 which had been used for cooling the engine cooling water, the modified apparatus does not use any of the first to third radiators 51 to 53 which had been used for cooling the engine cooling water until the predetermined time Tth elapses since no process of cooling the engine 110 was requested. Thus, the temperature of the hybrid device 180 can be assuredly maintained within the predetermined device temperature range Wtdev.

<Concrete Operation of Modified Apparatus>

Below, a concrete operation of the modified apparatus will be described. The CPU of the ECU 90 of the modified apparatus is configured or programmed to execute a routine shown by a flowchart in FIG. 10 each time a predetermined time elapses. The routine shown in FIG. 10 has been described above. Thus, the description of the routine shown in FIG. 10 will be omitted.

Figure 12:
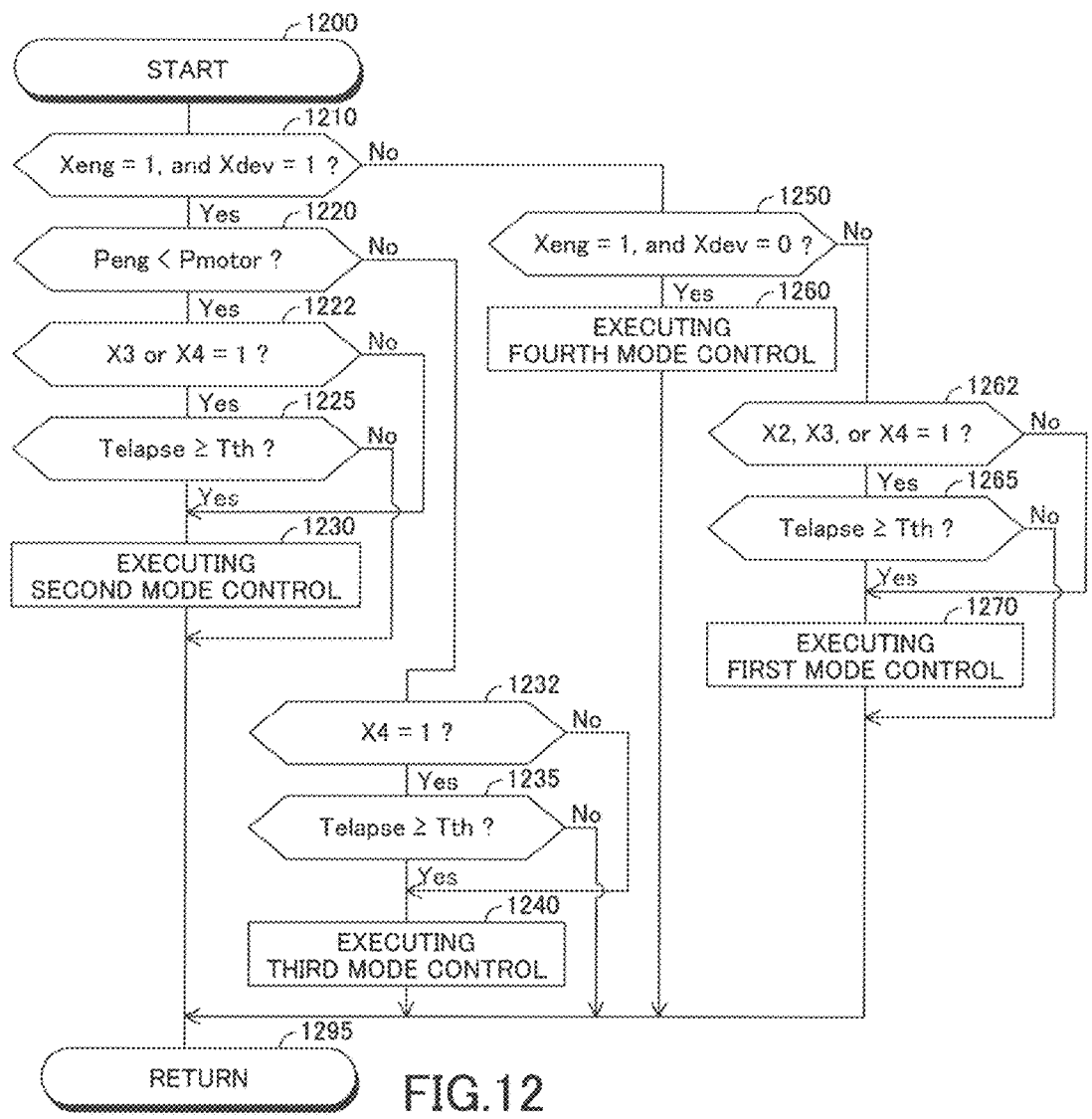
FIG. 12 is a view for showing a flowchart of a routine executed by the CPU.

In addition, the CPU is configured to or programmed to execute a routine shown by a flowchart in FIG. 12 in place of the routine shown in FIG. 11 each time a predetermined time elapses.

Therefore, at a predetermined timing, the CPU starts a process from a step 1200 in FIG. 12 and then, proceeds with the process to a step 1210 to determine whether the value of the engine operation flag Xeng is "1", and the value of the device operation flag Xdev is "1". When the value of the engine operation flag Xeng is "1", and the value of the device operation flag Xdev is "1", the CPU determines "Yes" at the step 1210 and then, proceeds with the process to a step 1220 to determine whether the engine output Peng is slammer than the motor output Pmotor.

When the engine output Peng is smaller than the motor output Pmotor, the CPU determines "Yes" at the step 1220 and then, proceeds with the process to a step 1222 to determine whether any of values of a third mode control flag X3 and a fourth mode control flag X4 is "1". The value of the third mode control flag X3 is set to "1" when the third mode control starts and is set to "0" when a control other than the third mode control starts. The value of the fourth mode control flag X4 is set to "1" when the fourth mode control starts and is set to "0" when a control other than the fourth mode control starts.

When any of the values of the third mode control flag X3 and the fourth mode control flag X4 is "1", the CPU determines "Yes" at the step 1222 and then, proceeds with the process to a step 1225 to determine whether an elapsing time Telapse is equal to or larger than the predetermined time Tth. The elapsing time Telapse is a time elapsing from when the process of cooling the engine 110 is stopped.

When the elapsing time Telapse is equal to or larger than the predetermined time Tth, the CPU determines "Yes" at the step 1225 and then, executes a process of a step 1230 described below. Then, the CPU proceeds with the process to a step 1295 to terminate this routine once.

Step 1230: The CPU executes the second mode control. Thereby, when the process of cooling the engine 110 is requested, the cooling water flows through the engine water circulation circuit 11, etc. as shown in FIG. 6. When the process of cooling the hybrid device 180 is requested, the cooling water flows through the device water circulation circuit 31, etc. as shown in FIG. 6.

On the other hand, when the elapsing time Telapse is smaller than the predetermined time Tth, the CPU determines "No" at the step 1225 and then, proceeds with the process to the step 1295 directly to terminate this routine once. In this case, the CPU continues to execute the third or fourth mode control which the CPU executes at the present time.

When the values of the third mode control flag X3 and the fourth mode control flag X4 are "0", respectively at a time of executing a process of the step 1222, the CPU determines "No" at the step 1222 and then, executes the process of the step 1230 described above. Then, the CPU proceeds with the process to the step 1295 to terminate this routine once.

When the engine output Peng is equal to or larger than the motor output Pmotor at a time of executing a process of the step 1220, the CPU determines "No" at the step 1220 and then, proceeds with the process to a step 1232 to determine whether the value of the fourth mode control flag X4 is "1".

When the value of the fourth mode control flag X4 is "1", the CPU determines "Yes" at the step 1232 and then, proceeds with the process to a step 1235 to determine whether the elapsing time Telapse is equal to or larger than the predetermined time Tth. When the elapsing time Telapse is equal to or larger than the predetermined time Tth, the CPU determines "Yes" at the step 1235 and then, executes a process of a step 1240 described below. Then, the CPU proceeds with the process to the step 1295 to terminate this routine once.

Step 1240: The CPU executes the third mode control. Thereby, when the process of cooling the engine 110 is requested, the cooling water flows through the engine water circulation circuit 11, etc. as shown in FIG. 7. When the process of cooling the hybrid device 180 is requested, the cooling water flows through the device water circulation circuit 31, etc. as shown in FIG. 7.

On the other hand, when the elapsing time Telapse is smaller than the predetermined time Tth, the CPU determines "No" at the step 1235 and then, proceeds with the process to the step 1295 directly to terminate this routine once. In this case, the CPU continues to execute the fourth mode control which the CPU executes at the present time.

When the value of the fourth mode control flag X4 is "0" at a time of executing a process of the step 1232, the CPU determines "No" at the step 1232 and then, executes the process of the step 1240 described above. Then, the CPU proceeds with the process to the step 1295 to terminate this routine once.

When any of the values of the engine operation flag Xeng and the device operation flag Xdev is "0" at a time of executing a process of the step 1210, the CPU determines "No" at the step 1210 and then, proceeds with the process to a step 1250 to determine whether the value of the engine operation flag Xeng is "1", and the value of the device operation flag Xdev is "0".

When the value of the engine operation flag Xeng is "1", and the value of the device operation flag Xdev is "0", the CPU determines "Yes" at the step 1250 and then, executes a process of a step 1260 described below. Then, the CPU proceeds with the process to the step 1295 to terminate this routine once.

Step 1260: The CPU executes the fourth mode control. Thereby, when the process of cooling the engine 110 is requested, the cooling water flows through the engine water circulation circuit 11, etc. as shown in FIG. 8. When the process of cooling the hybrid device 180 is requested, the cooling water flows through the device water circulation circuit 31, etc. as shown in FIG. 8.

On the other hand, when the value of the engine operation flag Xeng is "0", or the value of the device operation flag Xdev is "1", the CPU determines "No" at the step 1250 and then, proceeds with the process to a step 1262 to determine whether any of a value of a second mode control flag X2, the value of the third mode control flag X3, and the value of the fourth mode control flag X4 is "1". The value of the second mode control flag X2 is set to "1" when the second mode control starts and is set to "0" when a control other than the second mode control starts.

When any of the values of the second mode control flag X2, the third mode control flag X3, and the fourth mode control flag X4 is "1", the CPU determines "Yes" at the step 1262 and then, proceeds with the process to a step 1265 to determine whether the elapsing time Telapse is equal to or larger than the predetermined time Tth.

When the elapsing time Telapse is equal to or larger than the predetermined time Tth, the CPU determines "Yes" at the step 1265 and then, executes a process of a step 1270 described below. Then, the CPU proceeds with the process to the step 1295 to terminate this routine once.

Step 1270: The CPU executes the first mode control. Thereby, when the process of cooling the engine 110 is requested, the cooling water flows through the engine water circulation circuit 11, etc. as shown in FIG. 5. When the process of cooling the hybrid device 180 is requested, the cooling water flows through the device water circulation circuit 31, etc. as shown in FIG. 5.

On the other hand, when the elapsing time Telapse is smaller than the predetermined time Tth, the CPU determines "No" at the step 1265 and then, proceeds with the process to the step 1295 directly to terminate this routine once. In this case, the CPU continues to execute the second, third, or fourth mode control which the CPU executes at the present time.

When the values of the second mode control flag X2, the third mode control flag X3, and the fourth mode control flag X4 are "0", respectively at a time of executing a process of the step 1262, the CPU determines "No" at the step 1262 and then, executes the process of the step 1270 described above. Then, the CPU proceeds with the process to the step 1295 to terminate this routine once.

The concrete operation of the modified apparatus has been described. The cooling water having the requested engine cooling ability is supplied to the engine internal water passage 14, and the cooling water having the requested device cooling ability is supplied to the device internal water passage 34 by executing the routines shown in FIGS. 10 and 12. Thus, the engine 110 and the hybrid device 180 can be cooled appropriately.

In addition, any of the first to third radiators 51 to 53 which had been used for cooling the engine cooling water is not used for cooling the device cooling water until the predetermined time Tth elapses since the first to third radiators 51 to 53 ware not used for cooling the engine cooling water. Thus, the temperature of the hybrid device 180 can be assuredly maintained within the predetermined device temperature range Wtdev.

It should be noted that the engine radiator 12 is used only for cooling the engine cooling water. However, the embodiment apparatus may be configured to use the engine radiator 12 for cooling the device cooling water if necessary when the motor output Pmotor is larger than the engine output Peng. Similarly, the device radiator 32 is used only for cooling the device cooling water. However, the embodiment apparatus may be configured to use the device radiator 32 for cooling the engine cooling water if necessary when the engine output Peng is larger than the motor output Pmotor.

Further, the embodiment apparatus includes three radiators, that is, the first to third radiators 51 to 53 as radiators used for cooling the engine cooling water and the device cooling water. However, the embodiment apparatus may include one radiator, or two radiators, or four or more radiators as the radiator(s) used for cooling the engine cooling water and the device cooling water.

Furthermore, when the modified apparatus is about to use one or more of the previously-used radiator(s) 51 to 53 or the previously-used radiators 51 to 53 for cooling the device cooling water, the modified apparatus does not use the one or more of the previously-used radiator(s) 51 to 53 or the previously-used radiators 51 to 53 for cooling the device cooling water until the predetermined time Tth elapses since the one or more of the previously-used radiator(s) 51 to 53 or the previously-used radiators 51 to 53 was/were not used for cooling the engine cooling water.

However, when the modified apparatus is about to use one or more of the previously-used radiator(s) 51 to 53 or the previously-used radiators 51 to 53 for cooling the device cooling water, the modified apparatus may be configured not to use the previously-used radiator(s) 51 to 53 or the previously-used radiators 51 to 53 until the predetermined time Tth elapses since the previously-used radiator(s) 51 to 53 or the previously-used radiators 51 to 53 was/were not used for cooling the engine cooling water.

What is claimed is:

1. A cooling apparatus of vehicle driving apparatuses including an internal combustion engine and at least one electric motor for driving a vehicle, comprising:
   an engine water circulation circuit including an engine internal water passage formed in the internal combustion engine, cooling water being supplied to the engine internal water passage for cooling the internal combustion engine;
   a device water circulation circuit including a device internal water passage formed in a hybrid device including the at least one electric motor, the cooling water being supplied to the device internal water passage for cooling the hybrid device;
   at least three radiators for cooling the cooling water; and
   an electronic control unit for controlling flow of the cooling water,
   wherein the electronic control unit is configured to:
      control the flow of the cooling water so as to cool engine cooling water which is the cooling water supplied to the engine internal water passage by at least two of the radiators when a requested ability of the engine cooling water to cool the internal combustion engine, is equal to or larger than a requested ability of the cooling water supplied to the device internal water passage to cool the hybrid device, the number of the radiators used for cooling the engine cooling water being larger than the number of the remaining radiator or radiators; and
      control the flow of the cooling water so as to cool device cooling water which is the cooling water supplied to the device internal water passage by at least two of the radiators when the requested ability of the device cooling water to cool the hybrid device, is larger than the requested ability of the engine cooling water, the number of the radiators used for cooling the device cooling water being larger than the number of the remaining radiator or radiators.

2. The cooling apparatus of the vehicle driving apparatuses as set forth in claim 1, wherein the electronic control unit is configured to:
   control the flow of the cooling water so as to cool the device cooling water by at least one of the radiators when the requested ability of the engine cooling water is equal to or larger than the requested ability of the device cooling water while the internal combustion engine operates, and the hybrid device operates; and
   control the flow of the cooling water so as to cool the engine cooling water by at least one of the radiators when the requested ability of the device cooling water is larger than the requested ability of the engine cooling water while the internal combustion engine operates, and the hybrid device operates.

3. The cooling apparatus of the vehicle driving apparatuses as set forth in claim 1, wherein the electronic control unit is configured to:
   control the flow of the cooling water so as to cool the device cooling water by the radiator or radiators other than at least one radiator when the requested ability of the device cooling water is larger than the requested ability of the engine cooling water, and the requested ability of the engine cooling water is zero; and
   control the flow of the cooling water so as to cool the engine cooling water by the radiator or radiators other than at least one radiator when the requested ability of the engine cooling water is larger than the requested ability of the device cooling water, and the requested ability of the device cooling water is zero.

4. The cooling apparatus of the vehicle driving apparatuses as set forth in claim 1, wherein the electronic control unit is configured not to use the radiator or radiators which had been used for cooling the engine cooling water, for cooling the device cooling water until a predetermined time elapses since the radiator or radiators was or were not used for cooling the engine cooling water when the requested ability of the device cooling water becomes larger than the requested ability of the engine cooling water.

5. The cooling apparatus of the vehicle driving apparatuses as set forth in claim 1, wherein the electronic control unit is configured not to use the radiator or radiators which had been used for cooling the engine cooling water, for cooling the device cooling water until a predetermined time elapses since the radiator or radiators was or were not used for cooling the engine cooling water even when the number of the radiators used for cooling the device cooling water should be increased by using the radiator or radiators which had been used for cooling the engine cooling water.

6. The cooling apparatus of the vehicle driving apparatuses as set forth in claim 1, wherein the cooling apparatus comprises a variable cooling apparatus including a first radiator, a second radiator, and a third radiator,
   the variable cooling apparatus returns the cooling water flowing out of the engine water circulation circuit to the engine water circulation circuit through the first and second radiators and returns the cooling water out of the device water circulation circuit to the device water circulation circuit through the third radiator when the variable cooling apparatus operates at an engine cooling mode, and
   the variable cooling apparatus returns the cooling water flowing out of the device water circulation circuit to the device water circulation circuit through the second and third radiators and returns the cooling water out of the engine water circulation circuit to the engine water circulation circuit through the first radiator when the variable cooling apparatus operates at a device cooling mode,
   the electronic control unit is configured to:
      cause the variable cooling apparatus to operate at the engine cooling mode when the requested ability of the engine cooling water is equal to or larger than the requested ability of the device cooling water; and
      cause the variable cooling apparatus to operate at the device cooling mode when the requested ability of the device cooling water is larger than the requested ability of the engine cooling water.

7. The cooling apparatus of the vehicle driving apparatuses as set forth in claim 1, wherein the cooling apparatus comprises a variable cooling apparatus including at least one of the at least three radiators as a common radiator,
   at least one of the at least three radiators other than the common radiator is provided in the engine water circulation circuit as an engine radiator for cooling the cooling water flowing in the engine water circulation circuit,
   at least one of the at least three radiators other than the common radiator and the engine radiator is provided in the device water circulation circuit as a device radiator for cooling the cooling water flowing in the device water circulation circuit, the variable cooling apparatus returns the cooling water flowing out of the engine water circulation circuit to the engine water circulation circuit through the common radiator and the engine radiator when the variable cooling apparatus operates at an engine cooling mode, and the variable cooling apparatus returns the cooling water flowing out of the device water circulation circuit to the device water circulation circuit through the common radiator and the device radiator when the variable cooling apparatus operates at a device cooling mode, the electronic control unit is configured to:
- cause the variable cooling apparatus to operate at the engine cooling mode when the requested ability of the engine cooling water is equal to or larger than the requested ability of the device cooling water; and
- cause the variable cooling apparatus to operate at the device cooling mode when the requested ability of the device cooling water is larger than the requested ability of the engine cooling water.

* * * * *